United States Patent [19]

Conners

[11] Patent Number: 4,688,191

[45] Date of Patent: Aug. 18, 1987

[54] SINGLE BIT STORAGE AND RETRIEVAL WITH TRANSITION INTELLIGENCE

[75] Inventor: John P. Conners, Thiensville, Wis.

[73] Assignee: AMCA International Corporation, Hanover, N.H.

[21] Appl. No.: 548,302

[22] Filed: Nov. 3, 1983

[51] Int. Cl.⁴ .............................................. G06F 13/00
[52] U.S. Cl. ................................................... 364/900
[58] Field of Search ............... 364/200, 900, 140, 141, 364/436; 358/105; 375/260, 261; 371/69, 20

[56] References Cited

U.S. PATENT DOCUMENTS

| | | | |
|---|---|---|---|
| 3,701,110 | 10/1972 | Tsugami | 340/172.5 |
| 3,701,113 | 10/1972 | Chance et al. | 340/172.5 |
| 3,703,706 | 11/1972 | Ozura et al. | 340/146.1 BA |
| 3,737,577 | 6/1973 | Birkin | 340/172.5 X |
| 3,863,215 | 1/1975 | McGrogan, Jr. | 340/146.1 BA |
| 3,895,353 | 7/1975 | Dalton | 340/172.5 |
| 3,967,248 | 6/1976 | Kjöller et al. | 340/172.5 |
| 4,078,259 | 3/1978 | Soulsby et al. | 364/900 |
| 4,092,730 | 5/1978 | Burkett et al. | 364/900 |
| 4,099,668 | 7/1978 | Feilchenfeld et al. | 371/20 |
| 4,156,290 | 5/1979 | Lanza | 364/200 |
| 4,165,534 | 8/1979 | Dummermuth et al. | 364/900 |
| 4,174,537 | 11/1979 | Chu et al. | 364/200 |
| 4,212,076 | 6/1980 | Conners | 364/706 |
| 4,361,869 | 11/1982 | Johnson et al. | 364/200 |
| 4,370,708 | 1/1983 | Imazaki et al. | 364/200 |
| 4,429,299 | 1/1984 | Kabat et al. | 340/310 R |
| 4,519,025 | 5/1985 | Feyette | 371/67 |

OTHER PUBLICATIONS

Robert A. Whitehouse, *Gould Modicon Division 484 Manual*, Jan. 1979, pp. 44–47, 64–65.

Primary Examiner—Eddie P. Chan
Attorney, Agent, or Firm—Leydig, Voit & Mayer

[57] ABSTRACT

A peripheral processor for a central processing unit is in the form of a memory which is repetitively loaded with data scanning an array. The processor performs predefined logical operations between respective elements of successive scans of data. Preferably address signals sent to the peripheral processor via a preassigned set of address lines specify a desired one of a plurality of predetermined logical operations. Logical operations may also be performed when data is written to processor memory as well as read from the processor. A memory shift register, for example, automatically transfers original data from present scan memory to past scan memory when new data is loaded into present scan memory. In the field of machine control, the processor permits single-bit storage and retrieval with respect to a byte oriented memory and also detects individual bit transitions, thereby facilitating manipulation of single bit input/output data and the conditioning of machine control operations based on the occurrence of bit transitions.

10 Claims, 15 Drawing Figures

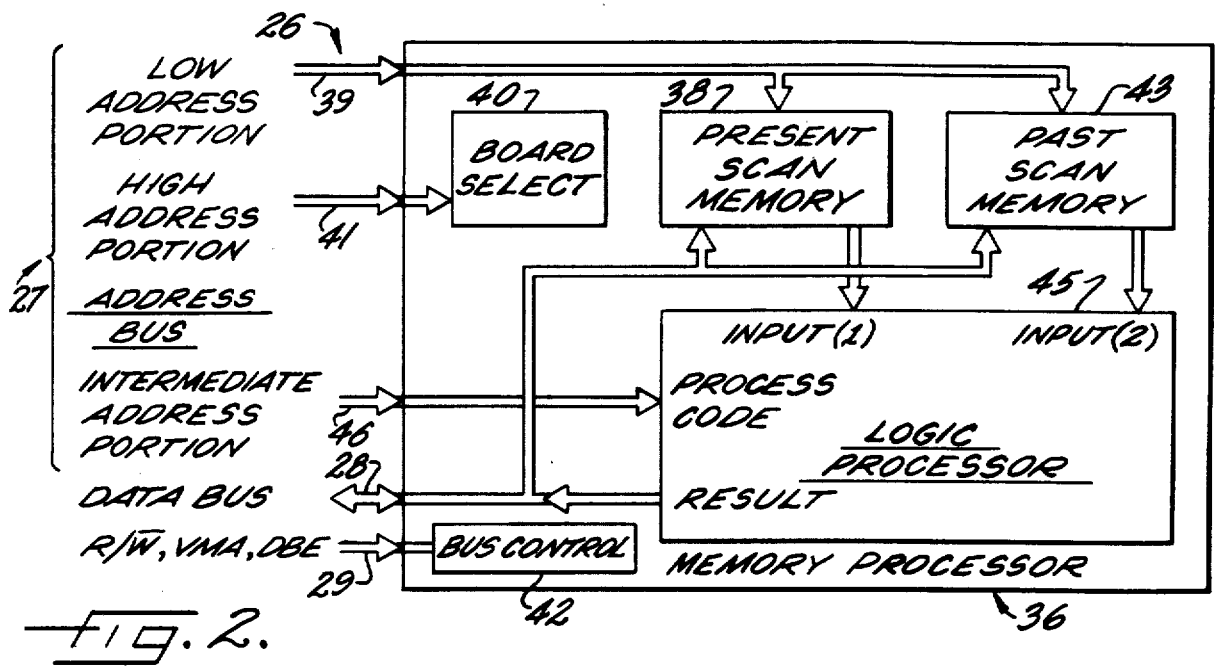
Fig. 2.
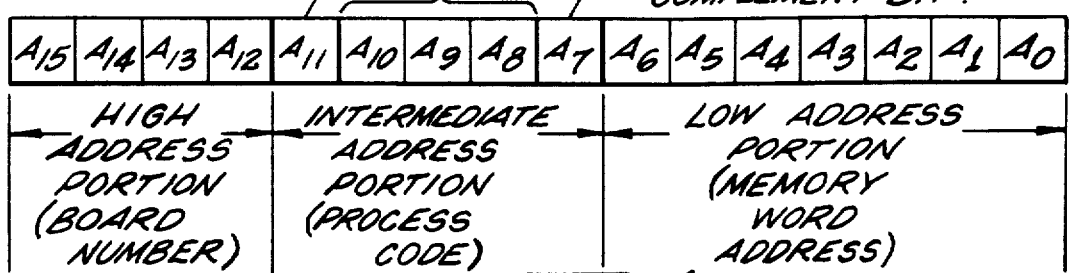
Fig. 3.
Fig. 4.

| OPERATIONS | CONTROL INPUTS | ADDRESSES |
|---|---|---|
| 1. BIT READ | MRDC = 1, | [N0000 - NBFFF] |
| 2. BIT WRITE | MWTC = 1, | [N0000 - N7FFF] |
| 3. BYTE READ | MRDC = 1, BHEN = 0, | [NC000 - NCFFF] |
| 4. BYTE WRITE | MWTC = 1, BHEN = 0, | [NC000 - NCFFF] |
| 5. WORD READ | MRDC = 1, BHEN = 1, | [NC000 - NCFFF] |
| 6. WORD WRITE | MWTC = 1, BHEN = 1, | [NC000 - NCFFF] |
Fig. 12.
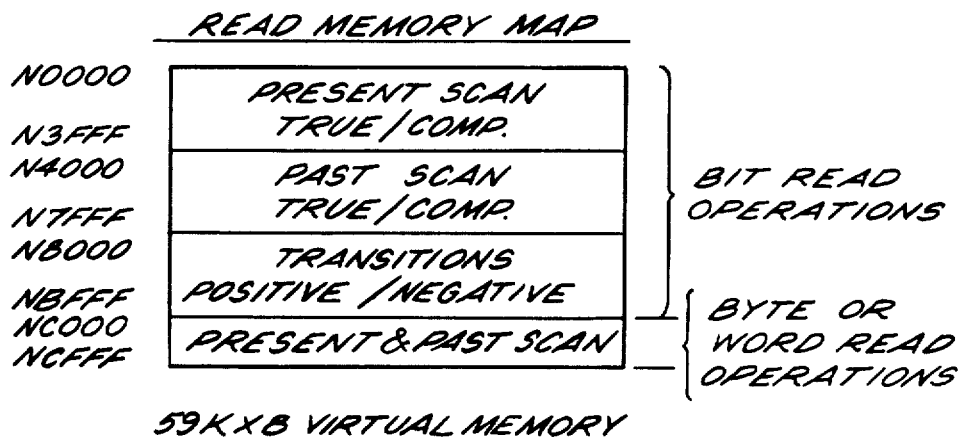
Fig. 13.
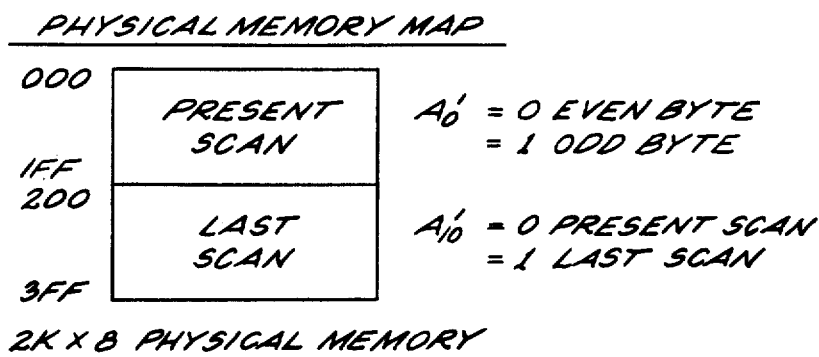
Fig. 14.

SINGLE BIT STORAGE AND RETRIEVAL WITH TRANSITION INTELLIGENCE

BACKGROUND OF THE INVENTION

1. Field of the Invention

This invention relates to peripheral processors for digital computers. More particularly, the invention pertains to a peripheral processor interfaced to the address and data bus of a microcomputer and occupying a portion of the memory space of the microcomputer. Specifically, the invention relates to a peripheral processor wherein a host microcomputer periodically loads an array of data into processor memory and the host microcomputer reads back the results from the processor.

2. Description of the Prior Art

The decreasing price/performance ratio for microprocessors and microcomputers is inducing electronic designers to substitute micros for minicomputers and special purpose dedicated hardware. But designers recognize that the computation or execution time for certain serial operations is a limiting factor. It is known, for example, that microprocessors require rather bulky and slow software for performing floating-point arithmetic. Thus, special hardware arithmetic circuits have been designed which are addressed in the same way as an input/output port. The arithmetic unit Am 9511 from AMD Corp., for instance, along with the four fundamental arithmetic operations, has routines for computation of transcendental functions.

Microprocessors and computers are widely used in the field of machine control to perform calculations and Boolean logic, but it is known that the typical byte-oriented machine data words are inefficient for performing Boolean operations on individual bits. Conners, U.S. Pat. No. 4,212,076 issued July 8, 1980, for example, discloses that a Boolean processor for processing any selected bit of any selected word held in memory should be combined with a computer's registers and arithmetic logic unit. The instruction/address register of the computer functions as a bit selection and logic instruction register for the Boolean processor.

In a particular programmable controller, the PC400 manufactured by Giddings & Lewis, Inc. (now Giddings & Lewis, Division of AMCA International, Fond du Lac, Wis.), single bit, on-off type input and output signals were viewed in groups as eight-bit wide words of memory and were addressable by an 6800 microprocessor acting under the address portions of instruction words. Any bit of any byte word could be brought back to the microprocessor on the highest order data line $D_7$. Moreover, instruction words which contained the operand address included a bit location within the address field to designate whether the selected bit of a selected byte was to be brought back in its true or complement form. Finally, the PC400 permitted output signals to be written to a selected bit of a byte word treated as writable memory, and the address coding designated the particular bit which was to be written to agree with the end result of a Boolean chain sequence. This resulted in "phantom" memory addresses in the PC400.

By "phantom" memory addresses it is meant that data is a single physical location of memory (e.g., the eight storage cells for one byte word) may be read onto the data bus in one form or another by applying one set or another of address signals to the memory address bus. The data which comes back to the central computer will appear as if they are different data held at two separate address locations, but in fact the retrieved data derives in each instance from common data at a single physical location. Phantom memory addressing should be distinguished from the case of the same data and the same physical memory location being read from at least two different memory locations due to "partial decoding." According to the method of partial decoding, address decoding is simplified by testing only those address bits which are needed to differentiate between memory locations actually existing in hardware. This presumes, of course, that the memory capacity of the system is under utilized.

By following the teachings of the Conners patent, chained Boolean processing is efficiently performed, and the many steps in the overall performance of the numerical control system may be made dependent on the results of Boolean sequences. The inputs, for example, are limit switches and other binary condition sensors on a machine, and the outputs are solenoid valves or indicator lamps. Each input or output corresponds to a particular bit or binary variable sensed or manipulated by the Boolean processor. To efficiently design the software or instruction sequence executed by the Boolean processor, each single-bit input and each single-bit output is assigned a distinct memory address. Thus, programmed control of a machine involves the three major steps of (1) receiving single-bit machine inputs which may change from time to time in real time, (2) performing chained Boolean calculations on input single bit data to generate single-bit output data, and (3) transmitting the single-bit machine outputs to the machine's solenoid valves or indicator lamps via appropriate drivers or relays.

Soulsby et al. U.S. Pat. No. 4,078,259 discloses that it may be desirable to have dedicated hardware for sequentially and repetitively performing steps (1) and (3). The input and output image tables are stored in separate memories which are sequentially scanned as data is transferred between the machine inputs and outputs and the respective memories. A microprocessor for performing chained Boolean operations has priority access to the input and output memories, at which time the "scanning in" or the "scanning out" procedure is interrupted. The lowest order bit $D_0$ of the microprocessor's 8-bit arithmetic logic unit is used as the single-bit Boolean accumulator.

Soulsby et al. uses single-bit input and output memories so that individual input and output bits are assigned different addresses, the addressed single bit being transferred to or from the lowest order data bit $D_0$. Address line $A_{13}$ provides a true/complement function on the addressed bit, thereby providing phantom addressing of a complement image table.

It has also been recognized that it is desirable to sense transitions in single-bit inputs and outputs in order to monitor for malfunctions in a programmable controller. As disclosed in Chance et al. U.S. Pat. No. 3,701,113 issued Oct. 24, 1972, a programmable controller continuously scans single-bit input and output signals and controls the output signals in normal fashion. During each "present scan," however, before each net bit is written into a scanning memory (58), the previous state from the "past scan" is read from the memory (58) for comparison to generate a transition signal when any transition occurs. The transition signal is transmitted to a data processing system separate from the programmable controller and the transition monitor, where the transition signal is recorded and sequentially stored as a transition word identifying the changing element and describing the change. The data processing system compares the sequence of transition words to a reference list in order to identify malfunctions.

It is a general objective of the present invention to reduce the cost of hardware, increase the speed of execution, and enhance the ease of programming for a computer system organized to control machine tools or the like wherein (i) arithmetic operations on quantified variables and (ii) logic manipulations on single-bit, on-off signals, are both to be performed.

More specifically, it is an object of the invention to facilitate the handling and use of single bit, on-off input signals in such a computer system by making it possible for transitions in any particular single bit input signal to be read back to a CPU as a result of the CPU executing what seems to it to be an ordinary memory read cycle.

Stated in different terms, it is an object to provide a scanned data memory to and from which a central processor can rapidly and efficiently transfer single-bit input and output data, and also from which transition information can be read by the central processor.

Another object of the present invention is to provide a scanned data memory in a microcomputer system wherein either selected bits, selected bytes, or the presence of positive or negative transitions in selected bits are addressable and retrieved by read cycles.

Yet another object of the invention is to provide a "memory processor" having a scanned data memory with both present scan memory and past scan memory, and means for performing predefined logical operations upon corresponding present and past scan memory elements during a memory read operation.

Still another object of the present invention is to provide a memory processor of the foregoing type having automatic means for transferring present scan memory data to past scan memory when new present scan data are written to the memory processor.

SUMMARY OF THE INVENTION

In accordance with the invention, a peripheral processor for a central processing unit is in the form of a memory which is repetitively loaded with data obtained by scanning an array in some source such as an input board holding on-off signals from a machine tool or the like and which may change randomly with time. The processor performs predefined logical operations between respective elements of successive scans of data. Preferably a process code is passed to the processor via a preassigned set of address lines to specify a desired one of a plurality of predefined logical operations. Moreover, logical operations may be performed when data are written to the processor memory as well as when data are read from the processor. A memory shift register, for example, automatically transfers original data from present scan memory to past scan memory when new data are located into present scan memory. In the field of machine control, the processor permits single bit storage and retrieval with respect to a byte oriented memory and also detects individual bit transitions, thereby facilitating manipulation of single-bit input/output data and the conditioning of machine control operations based upon the occurrence of bit transitions.

BRIEF DESCRIPTION OF THE DRAWINGS

Other objects and advantages of the invention will become apparent upon reading the following detailed description with reference to the accompanying drawings in which:

FIG. 2 is a generalized block diagram of the memory processor;

FIG. 3 is a read memory map showing the phantom addresses for the various results returned by an exemplary eight-bit embodiment of the memory processor;

FIG. 4 is a field diagram of the address line allocation corresponding to the read memory map of FIG. 3;

FIG. 12 is a table of the various logical operations performed by the 16-bit embodiment;

FIG. 13 is a read memory map for the 16-bit embodiment;

FIG. 4 is a physical memory map for the single integrated circuit memory used in the 16-bit embodiment.

Figure 15:
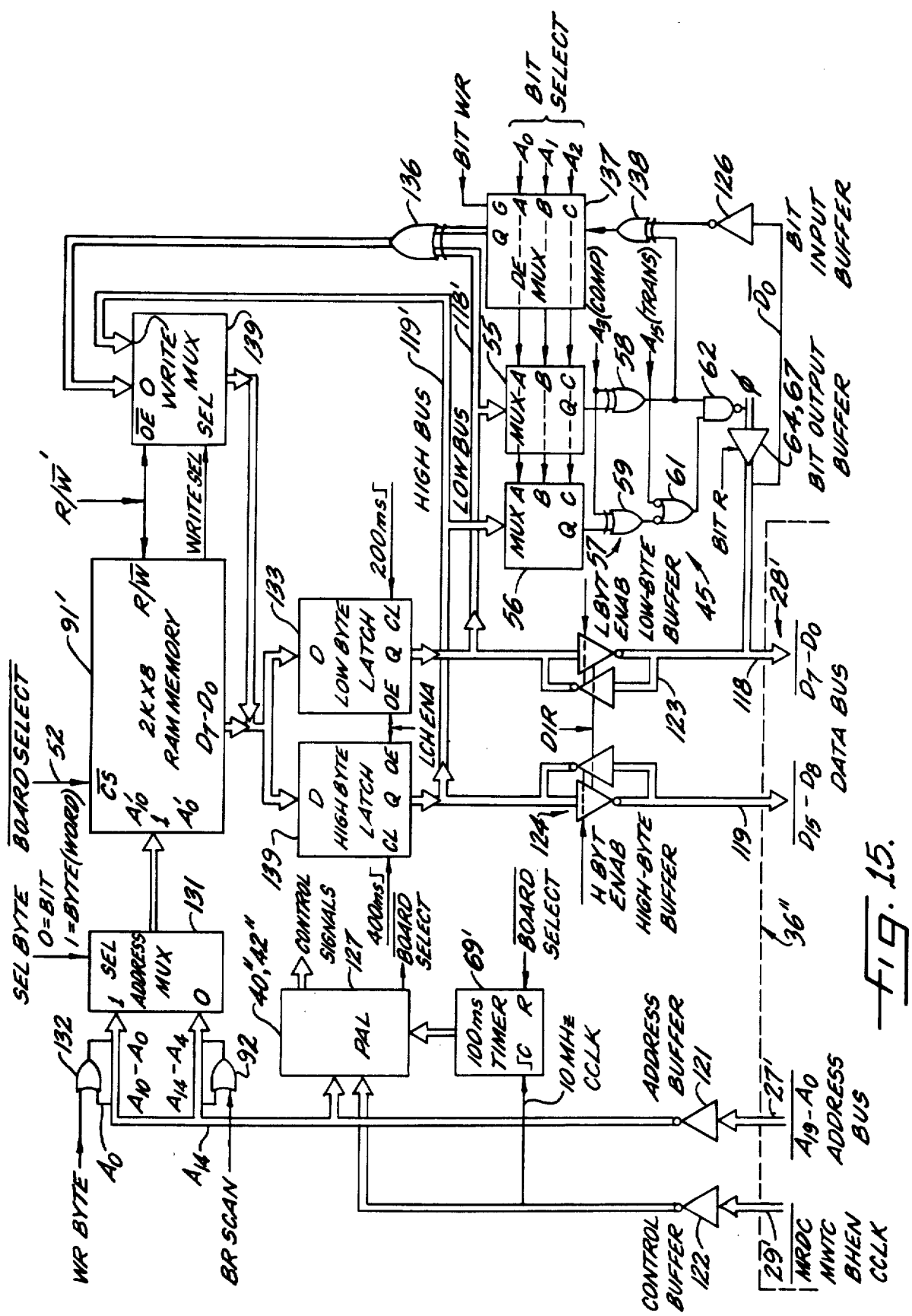
FIG. 15 is a functional block diagram of the 16-bit embodiment of the memory processor.

The control signal logic for the 16-bit embodiment of FIG. 15 is given in Table I appended to the specification. The execution sequences performed by the 16-bit embodiment of FIG. 15 in response to the control signal logic of Table I, are summarized in Table II appended to the specification.

While the invention is susceptible to various modifications and alternative forms, specific embodiments thereof have been shown by way of example in the drawings and will herein be described in detail. It should be understood, however, that it is not intended to limit the invention to the particular forms disclosed, but, on the contrary, the intention is to cover all modifications, equivalents, and alternatives falling within the spirit and scope of the invention as defined by the appended claims.

MODES FOR PRACTICING THE INVENTION

Figure 1:
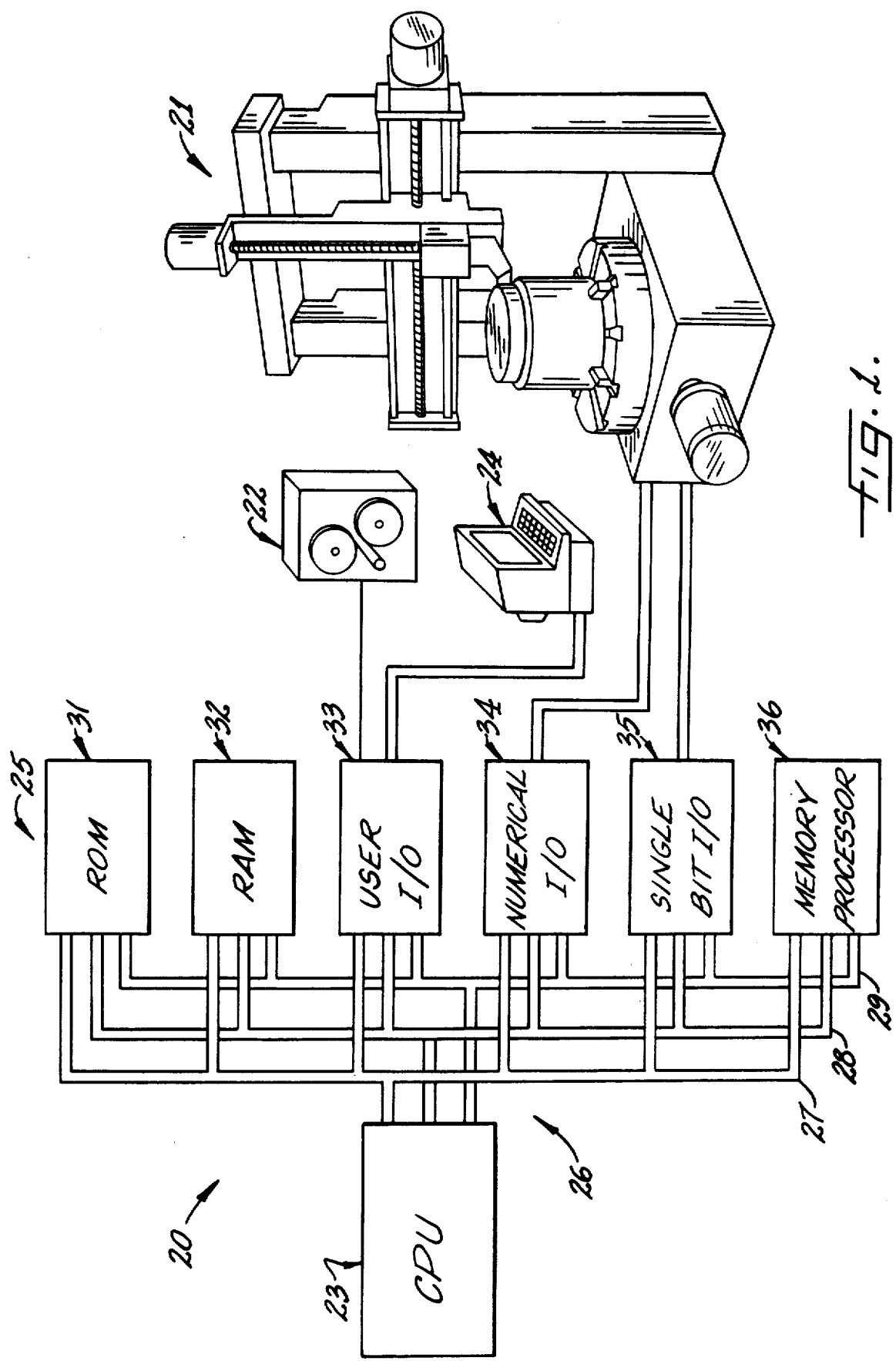
FIG. 1 is a block diagram showing a memory processor embodying the features of the invention, and employed in a numerical control system for a machine tool.

Turning now to the drawings, there is shown in FIG. 1 a numerical control system 20 controlling the operation of a machine tool 21 in response to a part program received from a tape drive 22. The part program is executed by a central processing unit (CPU) 23. The execution of the part program may be monitored by an operator through a control terminal 24. In addition to the central processing unit 23, the numerical control unit 20 has a number of circuit boards generally designated 25 interfaced to the central processing unit 23 by a computer bus generally designated 26 comprised of an address bus 27, a bi-directional data bus 28, and a control bus 29. The system is configured so that input, output, and memory locations are assigned unique addresses passed from the central processing unit 23 to the boards 25 via the address bus 27. Once an address is asserted on the address bus, data can then be exchanged between the central processing unit 23 and any one of the boards 25 via the bi-directional data bus 28. The control bus 29 has a plurality of control lines conveying signals which control or indicate the exchange of addresses or data on the address bus 27 and data bus 28, respectively. These control signals, for example, specify when the address bus 27 is conveying a stable or valid address and when the data bus 28 is available for data exchange, and further indicate the direction of data exchange, (e.g., write into memory or read from memory) over the data bus.

For the system shown in FIG. 1, the first of the boards 25 is a fixed program or read-only memory (ROM) board 31 containing, for example and among other program portions, a numerical control procedure for loading the part program from the tape drive 22 and beginning execution of the part program. The second board 32 is a random access memory (RAM) board which is used to store the part program from the tape drive 22, and to store data tables and the intermediate results of calculations. The third board 33 is a user input/output (I/O) board receiving data from the part program tape drive 22 and exchanging serial data with the control terminal 24. The fourth board 34 is a numerical input/output board receiving numerical data from the machine tool 21 such as tool feed position and spindle drive velocity, and transmitting control signals to the machine tool such as feed drive and spindle drive velocity commands. Then numerical input/output board 34 may have, for example, digital interfaces to resolvers or Inductosyn devices and may also have digital-to-analog converters and analog-to-digital converters for transmitting and receiving analog control signals and measurements, respectively. The fifth board 35 is a single-bit input/output board exchanging binary data representing whether limit switches and the like are open or closed and commanding solenoid valves, indicator lamps and the like to turn on or off. Generally speaking, the sensors (such as limit switches which supply input signal) and the actuators (such as solenoids which receive output signals), are bi-state devices; hence the input signals and the output signals may be regarded as single-bit, binary signals each having one of two states. It should be noted that in a complex machine tool 21, there are numerous such single-bit inputs and outputs. The inputs must be scanned, for example, at a relatively high rate on the order of 50 Hertz or once very 20 milliseconds so operations based upon their states, or changes in state, are promptly controlled. Likewise, the outputs need to be updated frequently (output memory scanned by reading out its contents to the output devices) to keep the machine dynamically up to date.

In the system of FIG. 1, the "single-bit I/O" board 35 is organized to treat groups of individual bi-state signals as addressable multi-bit words. If the microprocessor in the CPU 23 is 8 bits or 16 bits wide, then the groups would each contain 8 to 16 signals, respectively. The CPU 23 is programmed to periodically and sequentially read all the input signal words from board 35 and write them to assigned memory addresses within the memory processor 36—this being termed here an "input scan" of the machine's bi-state sensors. Likewise, the CPU 23 is programmed to periodically and sequentially read assigned addresses for output signal words in the memory processor 36, and write the contents to corresponding locations in the board 35—this being termed here an "output scan" which sends freshly updated signals (whether changed or not) to the bi-state actuators (e.g., solenoid valves or lamp drivers) on the machine 21. Input scans are executed, for example, at timed interrupts every twenty milliseconds; output scans may be similarly timed, or executed at more widely spaced interrupts and only if at least one output word has been changed by action of the CPU 23.

The input and output scans are straight-forward transfers of blocks of words, and thus each requires relatively little time. In the spans of time between scans, the CPU 23 performs its principal and normal arithmetic and Boolean logic sequences according to its executive program and the stored part program—this per se being known in the art and not claimed as a part of the present invention. But in the course of such operational sequences, the CPU may read signals (words, bytes or, in effect, single bits) from either the input signal or the output signal memory sections in the processor 36—to use such signals as logic operands—; and the CPU may write the results of arithmetic comparisons or logic sequences as updated output signals (words, bytes or, in effect, single bits) to the output signal memory section in the processor 36. It is this action which causes the on-off actuators (e.g., solenoid valves) on the machine 21 to be turned on or off as required in the execution of a part program. For brevity, illustrations and descriptions—of the output signal memory section in the board 36, and a description of writing data to that section and then making scanned readings of such section to transfer output signals to the I/O board 35—are all omitted here as not necessary to an understanding of the present invention.

A block diagram of the memory processor 36 is shown in FIG. 2. The memory processor is configured as a memory board insofar as it has a present scan memory 38 receiving the low address portion 39 of the address bus 27, a board select circuit 40 receiving the high address portion 41 of the address bus 27 for selecting the memory processor board in response to a limited subset of possible high address values, and a bus control circuit 42 receiving the control bus 29 for regulating the transfer of data between the data bus 28 and the present scan memory 38. The control bus 29 has, for example, a read/write signal ($R/\overline{W}$), a valid memory address signal VMA, and a data bus enable signal DBE.

In accordance with one aspect of the invention, the memory processor board 36 includes a past scan memory 43 having indivdiual memory locations corresponding to memory locations in the present scan memory 38. Each time an input signal word is about to be written to a present scan memory location during an input scan, the original contents in the present scan memory location are automatically transferred to the corresponding location in the past scan memory 43 before the fresh value of the input signal word is written into the present scan memory 38. Thus, values in the past scan memory 43 represent physical conditions of bi-state sensors as they existed one scanning period before the corresponding values in the present scan memory 38.

The data outputs of the present scan memory 38 and past scan memory 43 are fed to data inputs INPUT(1) and INPUT(2) of a logic processor 45 for performing a predefined logical operation on the pair of values read from the present scan memory and the past scan memory. The logic processor 45 automatically accesses both the present scan memory 38 and past scan memory 43 in response to a read operation by the central processing unit 23 and, during the single read cycle, returns on the data bus 28 the result or logical combination of the pair of corresponding data values from the present and past scan memories 38, 43. The logic processor 45, in other words, performs predefined logical operations on operands taken from successive scans of single bit input data.

Preferably a selection signal or process code is passed to the memory processor 36 via the computer bus 26, i.e., on a preassigned set of address lines, to specify a desired one of a plurality of predefined logical operations to be performed by the logic processor 45. As shown in FIG. 2, an intermediate address portion 46 of the address bus 27 is provided to supply the process code to the logic processor 45. In effect, by reading any of a large number of addresses signaled totally on bus portions 39, 41, 46 the CPU can access real and phantom address to obtain a present scan input signal or the result of some logical operation wherein that input signal is an operand. In practice, the set of available predefined logical operations is chosen with a specific application in mind for the memory processor 36. Logical operations between respective elements of successive scans of input data, for example, are required in a number of technical fields, for example, picture processing, data coding, and as will be discussed in detail below, machine control.

In the field of picture processing, each scan of data represents a frame of pictorial data. Logical operations between respective elements of the successive scans are logical operations between the same pixel element of successive frames and the logical operations are usually performed in order to take advantage of the high degree of correlation between the respective elements or pixel of the successive scans or frames of pictorial data. If the frame of pictorial data is represented as an array AR, to which a subscript is applied denoting the particular element in the array or pixel in the frame, and a superscript is applied denoting the number of the scan of the array, or the frame number, then the result of the logic processor 45, for the case of just a present scan memory input INPUT(1) and a past scan memory input INPUT(2), can be denoted by the functional relation:

$$RESULT = f(AR_i^{j+1}, AR_i^j)$$

The index i is specified by the low address portion 39 of the address bus 27 while the superscript j is specified by the particular time, scan or frame during which the central processing unit 23 initiates the single read cycle.

In the general field of data processing, data are sometimes treated as a successively scanned array for the purpose of intentionally correlating respective elements of successive scans of data in order to provide for error detection and correction or in an attempt to reduce the amount of data transmitted over a communications channel.

In the field of machine control, an especially useful logical operation is a transition detecting function between respective elements of a scanned data array AR containing individual single-bit input received from the machine tool. It is, in fact, useful to distinguish between zero-to-one or positive-going transitions of the single-bit inputs, and one-to-zero or negative-going transitions of the single-bit inputs. The positive-going transitions are detected according to:

$$RESULT = (AR_i^{j+1})(\overline{AR_i^j})$$

where the multiplication is a Boolean multiplication or logical AND function, and the bar denotes the logical or one's complement. The negative-going transitions are detected according to:

$$RESULT = (\overline{AR_i^{j+1}})(AR_i^j)$$

To distinguish the positive-going and negative-going transitions, a single polarity selecting address line of the intermediate address portion 46 of the address bus 27 is used to specify one bit of the process code to select the desired positive-going or negative-going transition detecting function.

According to an important feature of the invention, the present scan memory 38 is word oriented so that the central processing unit 23 can rapidly and sequentially transfer single-bit input data from the single-bit input-/output board 35 to the present scan memory 38 in groups, each group forming a word. Typically the CPU 23 may have a microprocessor eight-bits wide so the data bus and memories handle bytes of data. But it is desirable for the result of the logic processor 45 to be a single-bit result denoting whether a transition has occurred in a particular one of the eight bits in each byte of the present scan memory 38. The logic processor 45, in other words, must have an eight-fold multiplicity of logical operations, wherein each one of the eight subsets of operations corresponds to the selection of a particular bit position in the pair of bytes read from the present scan memory 38 and past scan memory 43 into the inputs INPUT(1) and INPUT(2), respectively. Preferably three address lines of the intermediate address portion 46 of the address bus 27 are reserved to specify a three-bit binary number as part of the process code to designate the desired bit position. So that the central processing unit 23 can recognize and manipulate the single-bit result, the logic processor 45 preferably returns the singlebit result on an assigned data line of the data bus 28 independent of the particular bit position selected. Thus, the central processing unit 23 can test this particular bit position of the data bus to condition the execution of the part program on the occurrence of either a positive or negative transition in the selected bit position corresponding to the selected single-bit input from the machine tool 21.

According to another feature of the present invention, the logic processor 45 also performs single-bit logical operations based on only the byte read from the present scan memory 38 and received on the first input, INPUT(1). It is sometimes desirable, for example, to read a particular bit in the present scan memory 38 corresponding to an individual single-bit input, and to use this particular bit to condition execution of the part program, or to pack or reformat the single-bit input with other single-bit inputs to form multiple-bit data. In either case, the selected bit is preferably returned on an assigned line of the data bus 28. Moreover, it is also desirable to provide a complement function so that either the desired bit or its complement is returned by the logic processor 45. As here to be described, a 0 or 1 signal on one particular address line of the intermediate address portion 46 of the address bus 27 is used to select read back of either (a) a desired bit in the present scan memory or (b) a transition in the particular bit. Also, another particular intermediate address line serves the dual function, when fed a 0 or 1 level signal, of calling for (i) true or complement read-back of a desired bit in present scan memory when case (a), supra, exists or (ii) positive or negative-going transition read-back of a desired bit where case (b), supra exists.

Consider now a specific embodiment of the present invention wherein an eight-bit microprocessor is used for the central processing unit 23 so that the address bus 27 has 16 lines specifying a four hexadecimal digit address. A read memory map for an exemplary memory processor board 36 is shown in FIG. 3 corresponding to an address allocation or assignment scheme shown in FIG. 4. The high address portion 41 of the address bus 27 comprises four address lines fed to the board select circuit 40 which looks at the most significant hexadecimal digit and compares it to a predetermined hexadecimal digit N in order to select the memory processor board 36 when the board number specified by this most significant hexadecimal digit matches the number N. Thus, the read memory map for the memory processor board 36 includes only the addresses having a first hexadecimal digit of N. The lower address portion 39 of the address bus 27 specifies the byte or memory word address for the present scan memory 38 and past scan memory 43, and has seven address lines corresponding to the seven least significant address bits $A_6$–$A_0$. Hence, the present scan memory 38 has 128 byte locations and also the past scan memory 43 has 128 byte locations. The intermediate address portion 46 comprises five address lines corresponding to address bits $A_{11}$–$A_7$. The most significant of the intermediate address bits $A_{11}$ is used as the transition selecting bit to select bit transition operations when the bit $A_{11}$ is a logical one, and bit selection operations when the bit $A_{11}$ is a logical zero. In other words, $A_{11}$ positively asserts whether a transition read-back is selected, and is thus designated a "transition bit." The three consecutive intermediate address bits $A_{10}$–$A_8$ specify a number 7–0 designating the bit position of the desired bit in the byte of the present scan memory 38 designated by the low order address bits $A_6$–$A_0$. The least significant address bit $A_7$ is a "polarity selecting bit" which in receiving a logic 1 signal selects read-back of the complement of the desired bit (when the $A_{11}$ signal is 0) or selects read back for a negative-going transition (when the $A_{11}$ signal is 1). In other words, the signal on line $A_7$ positively asserts whether the complement of the desired bit or a negative-going transition is selected, and is thus designated a "complement bit."

FIG. 3 shows successive blocks of memory locations with the initial or starting address value labeled in hexadecimal notation for each such block. Each block contains the same number of address locations, a unique address location in each block being provided for each byte or word in the present scan memory 38. It should be noted that the read memory map of FIG. 3 and the address allocation of FIG. 4 evidence the same information that is merely shown in different form. The read memory map of FIG. 3, for example, is more useful to the programmer or software engineer, while the address allocation diagram of FIG. 4 is more useful to the technician or hardware engineer. The software engineer, for example, need not know or understand how the hardware performs its assigned function in response to the address bits or even what particular address bits perform what particular hardware function. The software engineer need refer only to the read memory map of FIG. 3 to determine the memory location of the desired result from the memory processor 36. The starting address of the respective phantom address block is read from FIG. 3 and added to the address offset, of the desired individual byte or word in the block, from the starting address. If, for example, the programmer wishes to have bit 4 of the seventh byte in the present scan memory 38 retrieved to the CPU 23 he or she need only go to the "BIT 4" entry (47) in the read memory map of FIG. 3 to find the starting address of N400 of the phantom address block which handles bit 4 in true form. Then the programmer adds the desired memory word or byte offset of 0006 to the first byte starting address of N400 resulting in an address of N406, representing the phantom address of the fourth bit of the seventh byte in the present scan memory 38.

Similarly, if the programmer wants to address the occurrence of a positive-going transition of bit 5 in the seventy-sixth byte of the present scan memory 38, he or she merely finds the starting address NDOO for the phantom memory block for bit 5 positive-going transitions from the "⌐BIT 5" entry (48 in the read memory map of FIG. 3). The two lower order digits 4B are added to address the seventy-sixth word of memory (at address location number seventy-five or 4B hexadecimal), resulting in a complete phantom address of ND4B for the indication of a positive-going transition of bit 5 of the seventy-sixth byte of the present scan memory 38. It may be noted that the single-bit result residing at this phantom address is a logical one if a positive-going transition has occurred, and a logical zero if a positive-going transition has not occurred. By contrast, if the programmer wished to read back an indication that a negative-going transition had occurred in the same bit 5 of the seventy-sixth memory location, the read memory map in FIG. 2 shows that the second digit of the hexadecimal address must equal or exceed the value of "8" (thereby to make the A7 bit line (FIG. 4) carry a logic 1 signal). The programmer thus calls for reading at address NDCB by adding the offset 4B to the starting address ND80 for the "⌐BIT 5" block (49). The result NDCB may also be obtained by adding eight to the second digit in the complete address ND2C of the previous example. The single bit signal read back to the CPU 23 from phantom address NDCB will be a logic 1 or 0 if the bit 5 of the seventy-sixth word has or has not undergone a negative-going transition in the interval between the last-occurring input scan and the next-preceding input scan.

In the illustrated example, there are thirty-two blocks of phantom addresses, each block having the same number of "word locations" as the physical word locations in the present scan memory 38. Each such block corresponds to one of thirty-two different functions performed by the logic processor 45. All of the available logic functions correspond to reading desired individual bits (the desired bit within a given memory data word selected by address signals on lines $A_8$, $A_9$, $A_{10}$) and hence a memory processor 36 corresponding to the read memory map of FIG. 3 is useful for receiving and storing single-bit input data in byte form (i.e., eight bit words) and reading out and transmitting individual bits, or the occurrence of positive or negative transitions or individual bits, within any byte.

Figure 5:
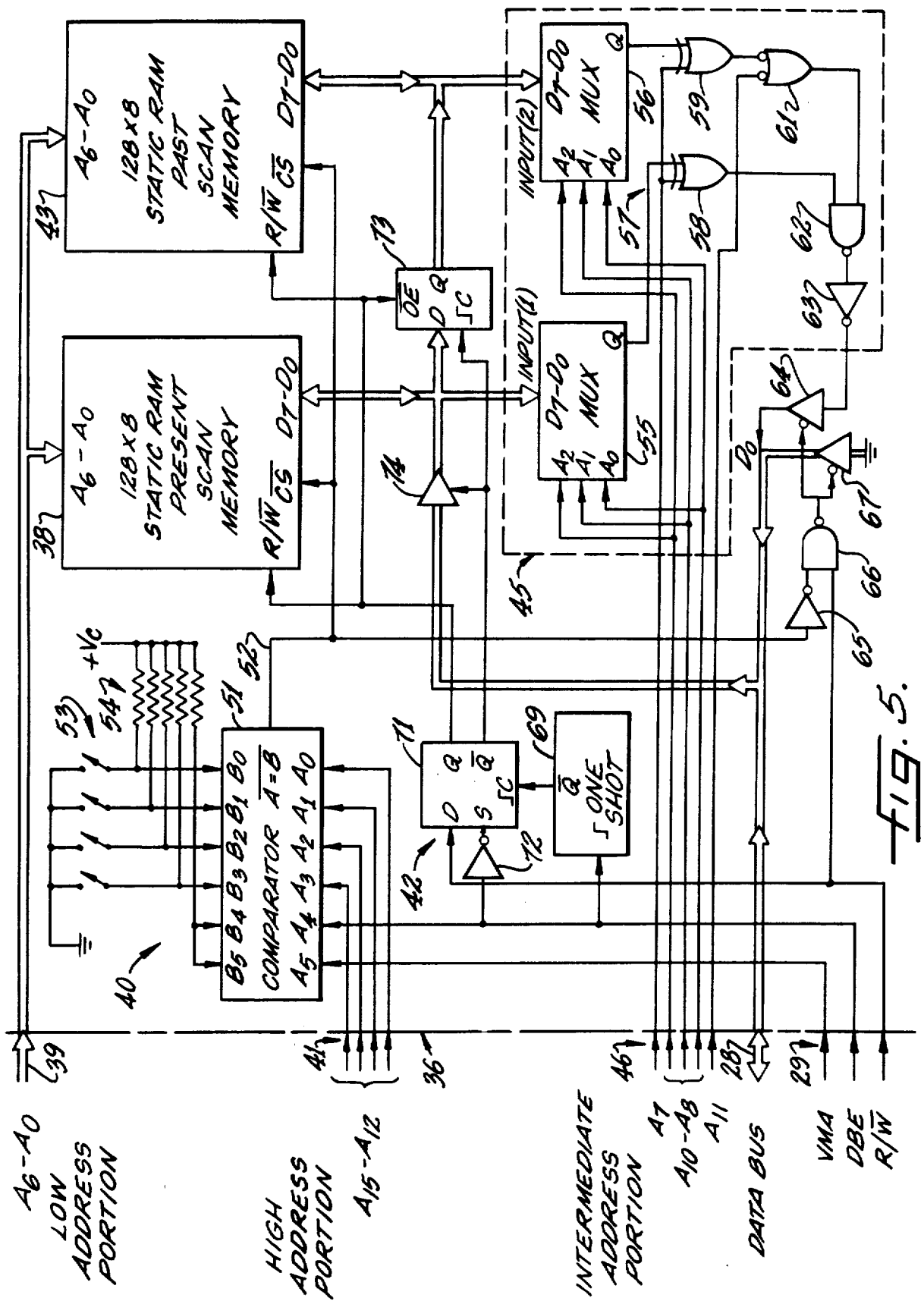
FIG. 5 is a schematic diagram of the eight-bit memory processor embodiment corresponding to the read memory map of FIG. 3 and the address field allocations of FIG. 4.

A schematic diagram of hardware for a memory processor 36—which operates according to the read memory map of FIG. 3 and the address assignment scheme of FIG. 4—is shown in FIG. 5. The present scan memory 38 and the past scan memory 43 are embodied in separate static RAM memory integrated circuits, each integrated circuit including 128 words (bytes) of memory (e.g., Part No. MCM6810 manufactured by Motorola, Inc.). A board select circuit 40 having a single comparator integrated circuit 51 (Part No. DM8131) generates a board select signal on the comparator output line 52 for enabling the memory integrated circuits 38, 43 via their chip select inputs $\overline{CS}$. The comparator 51 compares the signals on the high address lines $A_{15}$-$A_{12}$ to programmed signals established by a bank of switches 53 and pull up resistors 54 so that the board select circuit 40 responds to the hexadecimal digit N programmed in binary code by setting the respective switches 53 on and off. The comparator 51 also receives the valid memory address signal VMA and the data bus enable signal DBE from the control bus 29 in order that the board select signal on the output line 52 is active only when the memory address on the address bus 41 is valid and only when the data bus 28 is enabled to transfer data between the central processing unit 23 and the memory processor board 36.

The logic processor 45 receives five intermediate address lines 46 for address bits $A_{11}$-$A_7$ indicating a five-bit process code for thirty-two distinct logic functions. The three address lines $A_{10}$-$A_8$ specifying the desired bit position in the bytes read from the present scan memory 38 and past scan memory 39 are fed to bit selecting multiplexers 55, 56 (Part No. 74LS151) receiving the two logic processor inputs INPUT(1), INPUT(2) and having single-bit data outputs Q supplying the desired bit selected from the present scan memory 38 and the past scan memory 43, respectively. A combinatorial logic circuit generally designated 57 responsive to the transition bit $A_{11}$ and the complement bit $A_7$ generates a single-bit result from the data outputs Q of the bit-selecting multiplexers. Separate exculsive-OR gates 58, 59 (Part No. 74LS86) responsive to the complement bit $A_7$ conditionally invert the respective bits selected by the multiplexers 55, 56. NAND gates 61, 62 (Part No. 74LS00) combine the outputs of the exclusive-OR gates 58, 59 to selectively detect transitions in response to the transition bit $A_{11}$. An inverter 63 (Part No. 74LS04) provides the single-bit result which is fed to the least significant bit line $D_0$ of the eight-bit data bus 28. Therefore, when the transition bit $A_{11}$ is a logic one and the address bit $A_7$ is a logic zero, the output of the inverter 63 is a logic one only when the output of the multiplexer 55 is a logic one and the output of the multiplexer 56 is a logic zero, which occurs only for a positive going or zero-to-one transition between the addressed data bits of the scanned memories 38, 40.

Similarly, when the transition bit $A_{11}$ is a logic one and the address bit $A_7$ is a logic one, the output of the inverter 63 is a logic one only when the output of the multiplexer 55 is a logic zero and the output of the multiplexer 56 is a logic one, which occurs only for a negative going or one-to-zero transition between the addressed data bits of the scanned memories 38, 40.

The bus control circuitry 42 of the memory processor 36 synchronizes the interaction between the central processing unit 23 and the present scan memory 38, the past scan memory 43, and the logic processor 45. Operation of the bus control circuits 42 is illustrated by the timing diagram of FIG. 6. The valid memory address signal VMA is not shown in FIG. 6 since for the memory processor board 36 shown in FIG. 5, it is used only to enable the comparator 51 to generate the board select signal on the comparator output line 52. It can be assumed, in fact, that the valid memory address signal VMA is active whenever the data bus enable signal DBE is active. The data bus enable signal DBE is logically high for at least a predetermined memory cycle time $T_{mc}$ during which the central processing unit 23 addresses one of the boards 31–36 in the numerical control unit 20. Each time the data bus enable signal DBE is active, the read/write signal $R/\overline{W}$ is either high or low, indicating that the central processing unit 23 is executing either a read cycle or a write cycle.

For the two memory integrated circuit embodiment shown in FIG. 5, the central processing unit 23 reads back a single-bit result from the logic processor 45 in accordance with the read memory map of FIG. 3. During a read operation, the board select circuit 40 enables both the present scan memory integrated circuit 38 and the past scan memory integrated circuit 43 for a read operation thereby feeding bytes to the inputs INPUTS(1), INPUT(2) of the logic processor 45 so that the single-bit result appears on the output of the inverter 63. The only control circuitry required for the read operation is a tristate buffer 64 (Part No. 74LS125) for placing the single-bit result on the data line $D_o$ and activated whenever the board select signal on the comparator output line 52 is active (at logic low) and when the read/write signal $R/\overline{W}$ is a logical one indicating that the central processing unit 23 is reading the memory processor board 36. The logic required for generating a signal to activate the tristate buffer 64 is an inverter 65 (Part No. 74LS04) and a NAND gate 66 (Part No. 74LS00).

In order that the central processing unit 23 can easily manipulate the single-bit result, the other data lines $D_7$–$D_1$ are set to logical zero during the read operation. For this purpose a bank of seven tristate buffers 67 (Part No. 74LS125) assert a logical zero on the data lines $D_7$–$D_1$ whenever the tristate buffer 64 is activated. This manner of placing the output bit on an assigned data bus line permits the central processing unit 23 to easily test the logic state of the output bit with a TEST instruction since then the zero condition code bit in the condition register of the central processing unit 23 is set in accordance with the logical value of the least significant data bit $D_0$. The logical zeros asserted on the data bus by the tristate buffers 67 are also convenient for masking the output bit into other combinations of bits using a logical OR instruction.

The bus control circuitry for enabling the central processing unit 23 to perform a write operation to the memory processor board 36 is more involved. It should be noted that the present scan memory 38 is chip selected by the output of the board select circuit 40 so that partial decoding is used for the write operation. The present scan memory 38, in other words, can be written to at any of the thirty-two repetitive address blocks which respectively have starting addresses from N000 to NF80 as labeled in FIG. 3. The central processing unit 23 writes to the present scan memory 38 whenever the first hexadecimal digit of the address is equal to N, the number programmed via the switches 53—providing that a $\overline{W}$ signal reaches the R/$\overline{W}$ control terminal of the chip 38. The data byte from the central processing unit 23—arriving over data bus 28—is written to the byte position in the present scan memory 38 specified by the seven least significant address bits $A_6$-$A_0$ received on the low address portion 39 of the address bus.

It should be noted, however, that before data is written to a word location in the present scan memory 38, the existing data at that location is first automatically transferred from the present scan memory 38 to the past scan memory 43. In other words, for every single write cycle from the central processing unit 23, the present scan memory 38 is first read before the new data are written to the present scan memory 38 at the addressed location. The original data are transferred or written to the past scan memory 43. Both the present scan memory 38 and the past scan memory 43 are simultaneously "chip selected". The transfer must be automatic since according to the address assignment scheme shown in FIG. 4 there is no independent byte read operation on the present scan memory 38.

Figure 6:
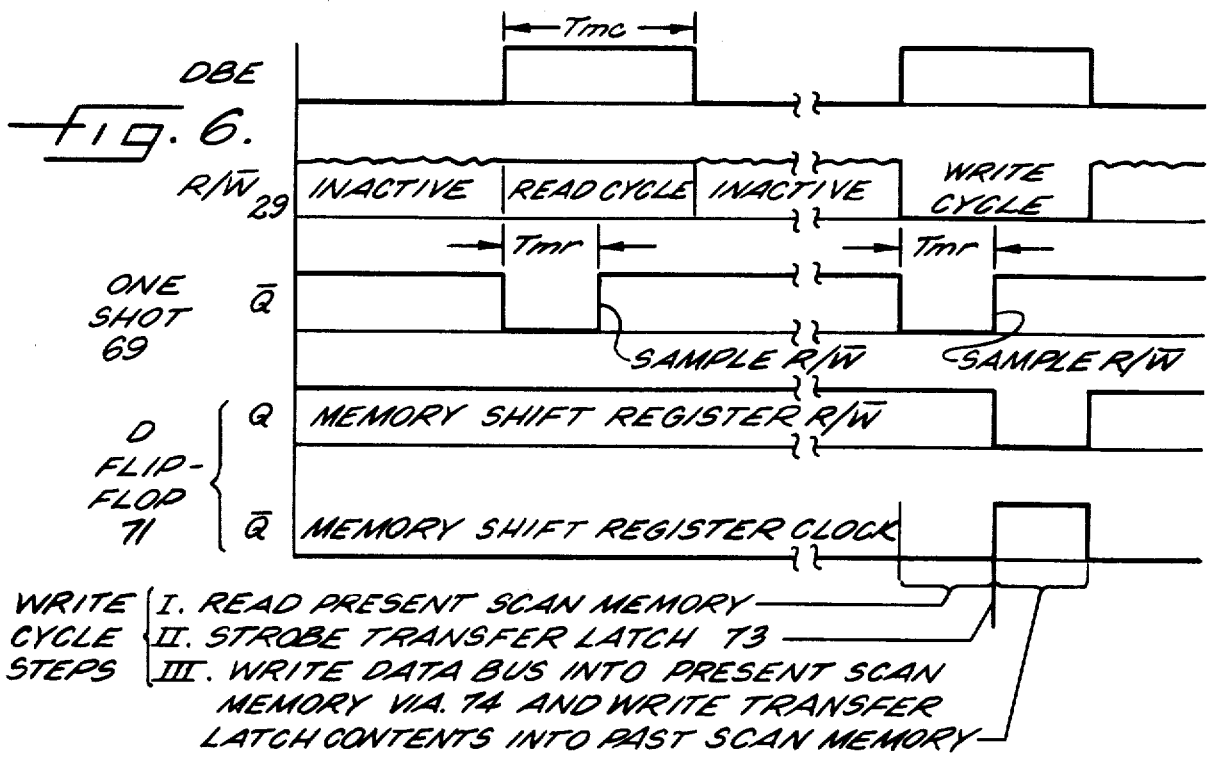
FIG. 6 is a timing diagram to aid in understanding the operation of a memory shift register used in the embodiment of FIG. 5.

Since two memory operations must be performed on the present scan memory 38 during a single memory write cycle by the central processing unit 23, the bus control circuitry 42 must generate a read/write signal having first a read cycle and then a write cycle during the time period when the read/write signal R/$\overline{W}$ of the control bus 29 is low, indicating a write operation is commanded by the central processing unit 23. In order to generate this artificial read/write signal for the present scan memory 38, a one-shot 69 (Part No. 74LS121) is triggered by the data bus enable signal DBE going active thereby defining a pulse of width $T_{mr}$ (FIG. 6) to define the time for reading out the original contents of the present scan memory 38 before new data is written into the present scan memory. As shown in FIG. 6, this read-before-write time $T_{mr}$ is approximately half of the cycle time $T_{mc}$ for a single read or write operation by the central processing unit 23. To generate a read/write signal for the present scan memory 38 and the past scan memory 43, the rising edge of the complement one-shot 69 output $\overline{Q}$ is used to clock a D type delay flip-flop 71 (Part No. 74LS74) whose D terminal samples the read/write signal R/$\overline{W}$ on the control bus 29. To ensure that the flip-flop 71 is initially in a set state prior to any read or write cycle initiated by the central processor unit 23, the set input S of the delay flip-flop 71 receives the complement of the data bus enable signal DBE as provided by an inverter 72 (Part No. 74LS04). Thus, during a complete write cycle called for by the central processor, the Q output of the flip-flop 71 provides th initial logic high "read" signal, followed by a logic low "write" signal to the R/$\overline{W}$ terminals of the present scan memory 38 and the past scan memory 43. See FIG. 6. That is, during a write cycle and after the delay $T_{mr}$ measured off by the one-shot 69, the Q output from 71 switches from the high "read" level to the low "write" level, in consequence the processor 23 calling initially by making the R/$\overline{W}$ control line 29 low. Present scan and previous scan memories 38 and 43 thus are both first enabled to read out data on their terminals $D_7$-$D_0$. Such data from memory 38 gets latched into an eight bit latch 73; but such data signals from memory 43 have no effect because the lines leading from its terminals $D_7$-$D_0$ lead to no storage elements.

The transfer latch 73 (eight bits wide) is clocked by the rising edge of the inverted output $\overline{Q}$ of the delay flip-flop 71. The latch 73 receives the original data read from the present scan memory 38 and has an output presenting the original data to the data input/output terminals $D_7$-$D_0$ of the past scan memory 43. Since the present scan memory 38 and the past scan memory 43 have bi-directional data lines, a tristate buffer 74 (Part No. 74LS126) is used to isolate the data lines of the present scan memory from the data bus 28, and the latch 73 (Part No. 74LS374) has tristate outputs. The control line for the buffer 74 receives the inverted output $\overline{Q}$ of the delay flip-flop 71 and thus is enabled only during the time interval when flip-flop resides in its reset state. The latch 73 has its output enable $\overline{OE}$ driven low by the output Q of the delay flip-flop 71; thus the latch feeds data to the past scan memory for writing during that same interval.

The combination of the present scan memory 38, the past scan memory 43, the transfer latch 73, and the flip-flop 71 and associated components comprise a "memory shift register" so that, in a single shift register cycle, data is successively (1) read from the addressed byte of the present scan memory 38, (2) clocked into the transfer latch 73, and then (3) written into the past scan memory 43 at a corresponding data word location designated by the signals at $A_0$-$A_6$. During the time that (3) is occurring, fresh data is written from the bus 28 via gated buffer 74 to the same word location in the present scan memory, but such fresh data is ignored by the latch 73. It will become apparent to persons skilled in the art that the memory shift register can be extended to include any number of shift register stages rather than just two stages as shown in FIG. 5. It is merely necessary to add additional memories with address inputs in parallel and to provide additional transfer latches 73 between the data lines of the memories. Memory shift registers having multiple stages could be useful in conjunction with logic processors 45 having more than two inputs in order to perform complex functions between respective elements of picture fields or to provide complex coding or decoding for error detection and correction for digital data transmission.

Figure 7:
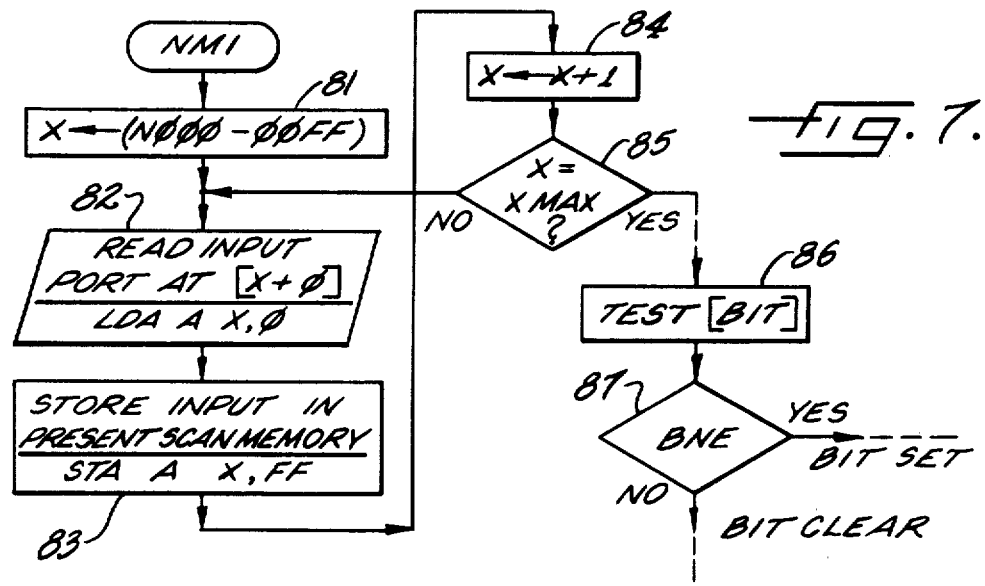
FIG. 7 is a flow chart of simplified exemplary central processor operations for loading present scan memory in the circuit of FIG. 5 and conditioning machine control operations based on the testing of single bits addressed at the phantom locations shown in FIG. 3.

Turning now to FIG. 7, there is shown a flow chart of a procedure executed by an eight-bit microprocessor (Part No. MC6800) used as the main element of the central processing unit 23 in order to transfer bytes of data from the single-bit input/output board 35 to the present scan memory 38 of the memory processor board 36. This will be recognized as an "input scan" which involves writing of data words (groups of single bit signals) into the memory processor 36. In order that the data may be easily transferred from the single-bit input/output board 35 to the memory processor board 36 using indexed microprocessor instructions, the single-bit input/output board is assigned addresses just below the addresses assigned to the memory processor board 36. The offset between corresponding single-bit inputs and memory locations in the present scan memory 38 of the memory processor board 36 is chosen to be equal to or less than FF hexadecimal, the maximum address offset permitted for the indexed microcomputer instructions. Thus, in the first step 81 of the transfer procedure of FIG. 7, the index register X is set equal to the first address N000 of the present scan memory 38 less the maximum offset 00FF permitted for the indexed microprocessor instructions. Then in step 82 the microprocessor accumulator A is loaded with the contents of the memory location specified by the index register X. In other words, the lowest addressed byte of the single-bit input/output board 35 is read into the accumulator A. In step 83 the contents of accumulator A are stored at a memory location equal to the index register value plus the offset FF, or in other words at address N000, being the address of the byte having the lowest address in the present scan memory 38. Thus, the first data word or byte of the single-bit input board 35 has been transferred to the first word location of the present scan memory 38 in the memory processor 36. It will be remembered, of course, that just before writing to the first address location in the memory 38 takes place, the contents of that location are read out and latched; then such latched data is written to the corresponding location in the memory 43.

In step 84 the value of the index register X is incremented in order to point to the next byte of the single-bit input/output board 35. In step 85 the value of the index register X is compared to a predetermined maximum XMAX to determine whether all of the input bytes in the single-bit input/output board 35 have been transferred to the present scan memory 38 of the memory processor board 36. If X is not equal to the maximum XMAX, execution proceeds with step 82 in order to transfer the next byte. Otherwise, execution of the transfer routine is completed and the main CPU 23 proceeds with its operations to control the machine tool 21. It may be noted that the procedure shown in FIG. 7 rapidly transfers data from the single-bit input/output board 35 to the memory processor board 36 since only four machine instructions are required to transfer each byte of data.

The numerical control procedure is conditioned, for example, by the values of the single-bit signals read from phantom address locations of the memory processor 36. The reading, for example, is performed at various points or steps in the executive program of the CPU 23, by a TEST instruction 86 followed by a branch on condition instruction 87 (e.g., branch if not equal to zero, or BNE) transferring execution to one of two different branches of the numerical control program depending on whether the single-bit result returned by the memory processor 36 is a logical one (set) or logical zero (clear). Moreover, as single selected input bits (read in true or complement form or as indications of positive or negative going transitions from the various phantom address) are brought to the CPU on data bus line D7, they may be used as the successive operands for chains of Boolean logic operations; and the results may be written back to memory circuits (not shown) forming the single bit output image table.

Figure 8:
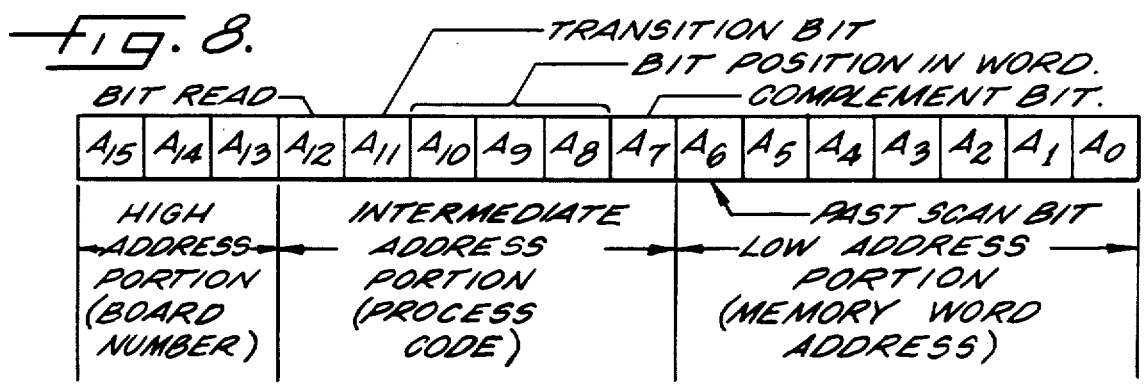
FIG. 8 is a field diagram for the address line allocations for a second eight-bit embodiment of the memory processor using a single integrated circuit for both present scan memory and past scan memory.
Figure 9:
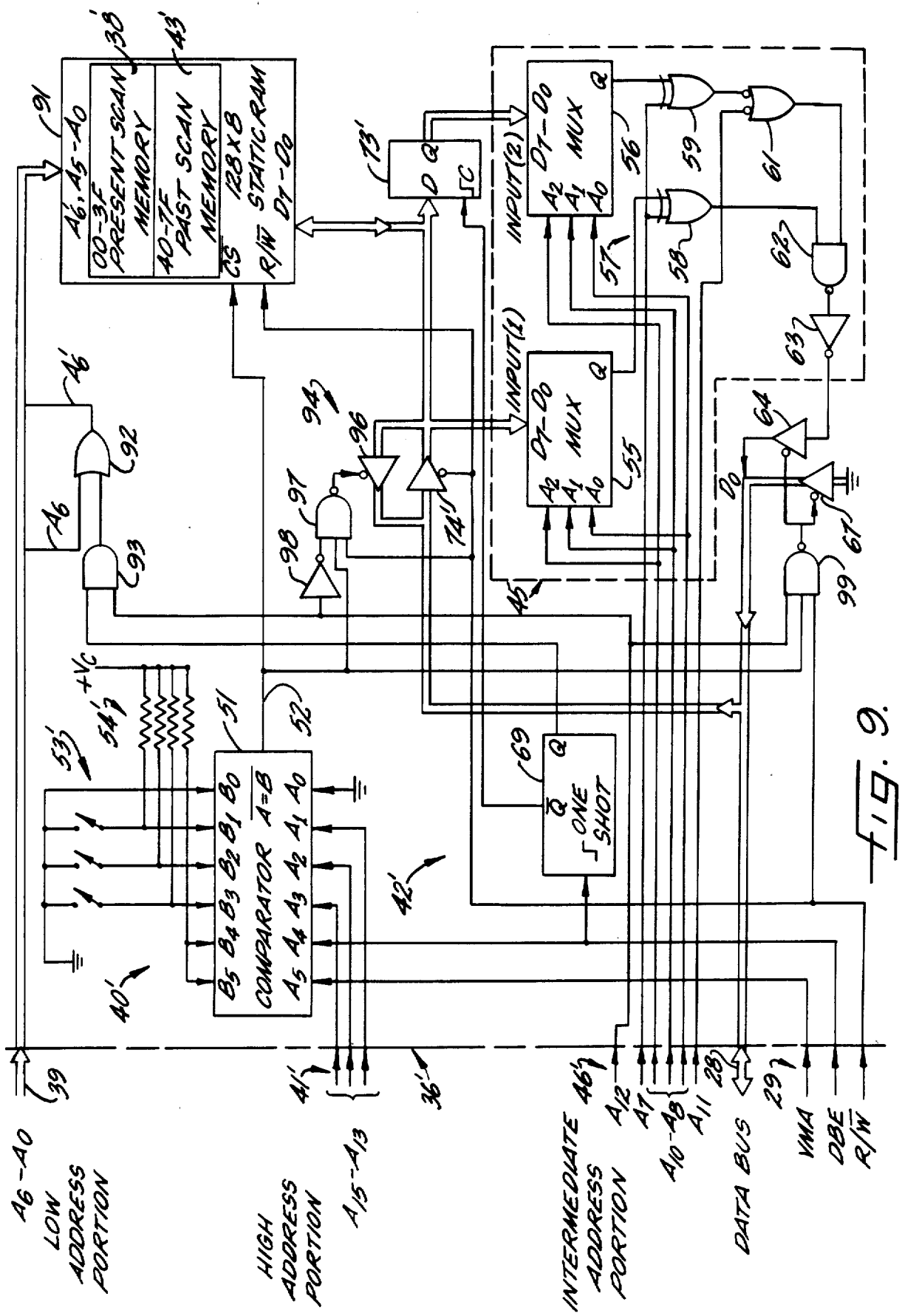
FIG. 9 is a schematic diagram of the second eight-bit embodiment corresponding to the address line allocations of FIG. 8.
Figure 10:
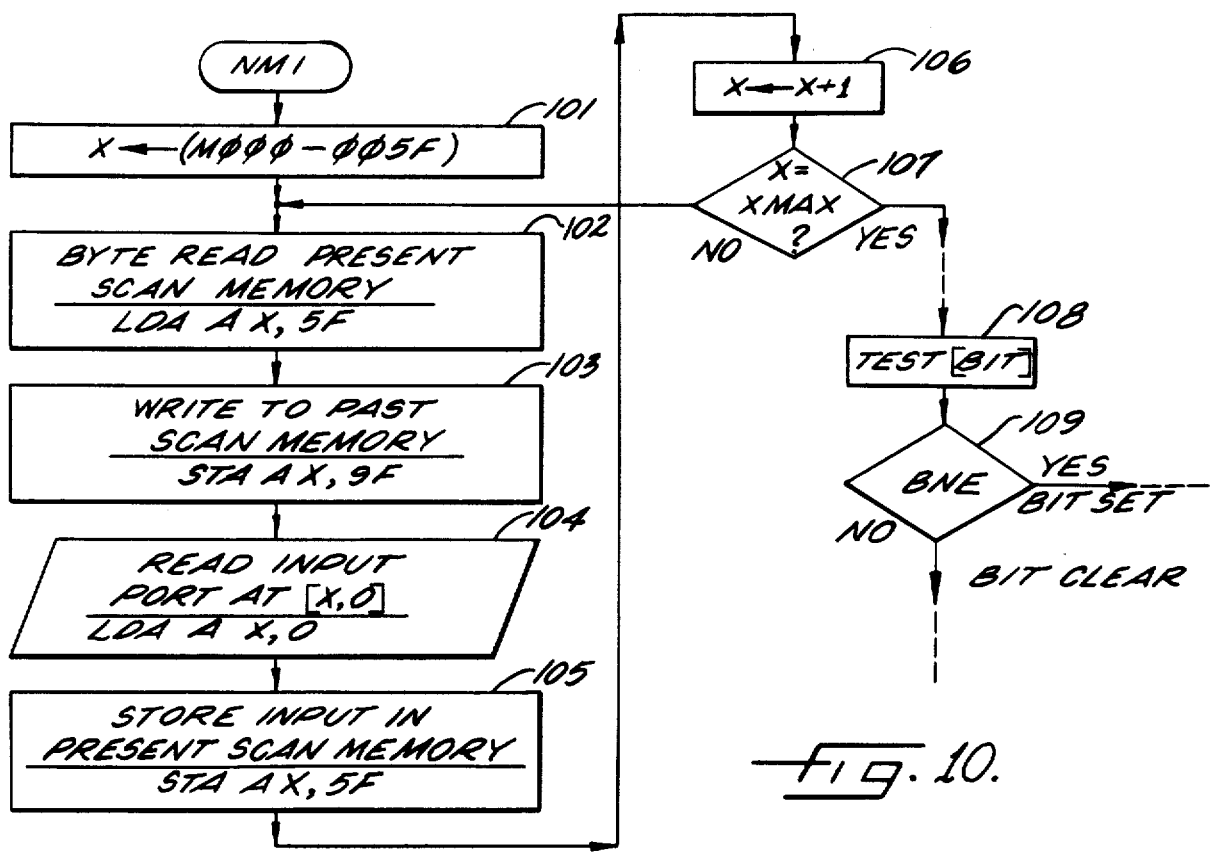
FIG. 10 is a flow chart of simplified but illustrative central processor operations for transferring data from present scan memory to past scan memory and loading new data into the present scan memory as required when the second eight-bit embodiment of FIG. 9 is used.

The system shown in FIGS. 3-7 is a system for an eight-bit memory board 36 that uses two separate integrated circuits for the present scan memory 38 and the past scan memory 43. FIGS. 8-10 show a second embodiment utilizing a single integrated circuit memory having address locations for both the present scan memory and the past scan memory. For automatic transfer of a present scan word to past scan storage, three memory cycles are executed by the central processing unit 23 to carry out "writing" of one input data word from board 35 to board 36. This entails reading a full data word or byte from the present scan memory section to the CPU accumulator.

To provide for a byte read operation, the address bits may be allocated as shown in the diagram of FIG. 8 so that address bit $A_{12}$ selects a bit read operation if it is a logical one, and a byte read if it is a logical zero. It should be noted that the low address portion comprising address bits $A_6$–$A_0$ is still used to address the single memory integrated circuit, so that the total of one hundred twenty-eight bytes are in the integrated circuit 91 (FIG. 9), but this includes only sixty-four bytes of present scan memory 38' and sixty-four bytes of past scan memory 43'. The most significant address bit in the low address portion $A_6$ is thus a past scan bit selecting past scan memory locations if it is a logical one and selecting present scan memory locations if it is a logical zero.

FIG. 9 is a schematic diagram for a memory processor board 36' having the address allocations set out in FIG. 8. A single memory integrated circuit 91 provides both the present scan memory locations 38' and the past scan memory locations 43'. To perform a bit read function to detect bit transitions, the present scan memory location 38' and the past scan memory location 43' for the desired byte must be sequentially read during a single central processor unit 23 read cycle. Hence, the most significant address bit $A_6$ to the single memory integrated circuit 91 must be toggled in the middle of the central processor read cycle $T_{mc}$. For this purpose, it is assumed that during a bit read instruction the address line $A_6$ carries a logical zero, so that a logical OR gate 92 can set the most significant address bit $A_6'$ to the memory integrated circuit 91 to a logical one during the first half period $T_{mr}$ (FIG. 6) in order to read the past scan memory location 43', before the corresponding present scan memory location 38' is read during the remainder of the central processor unit 23 read cycle. A transfer latch 73' is always clocked at the end of the initial half cycle $T_{mr}$ in order to latch any reading of the past scan memory locations 43'. This latch 73' is clocked by the negative output $\overline{Q}$, from the one-shot 69. In order that the toggling of the address bit $A_6$ occurs only for a bit read instruction and not, for example, for a byte write instruction, an AND gate 93 gates the positive output of the one-shot 69 with the bit read address bit $A_{12}$ to provide the setting input to the logical OR gate 92. In practice the AND/OR logic function 93, 92 is performed by three NAND gates (Part No. 74LS00). During a bit read (true or complement from memory portion 38') when address lines $A_{12}$ and $A_{11}$ are respectively at logic high and low, the multiplexer 55 is operative and multiplexer 56 has no effect due to the gate 61. During a bit read for transition (positive or negative-going depending on the logic level of address line $A_7$) when address lines $A_{12}$ and $A_{11}$ are both at logic high, then the selected word from past scan memory 43' is first strobed into latch 73', the corresponding word is brought from present scan memory 38' to the input of multiplexer 55—so that the circuit components 55, 56, 57 and 64 all function as previously explained to signal the occurrence or nonoccurrence of a transition on data line $D_7$.

It should also be noted that since there is no automatic transfer (by a shift register arrangement as in FIG. 5) between the present scan memory locations 38' and the past scan memory locations 43', the read/write signal R/$\overline{W}$ from the control bus 29 can be used to directly control the read/write input to the memory integrated circuit 91. The memory chip select $\overline{CS}$ signal is provided by the comparator integrated circuit 51, but in FIG. 9 the high address portion consists of only the three most significant address bits $A_{15}$–$A_{13}$ so that the board select circuit 40' does not receive the address line $A_{12}$. The bank of switches 53' need have only three switches and the bank of pull-up resistors 54' need have only four resistors.

Since bytes of data are both read from and written to the single memory integrated circuit 91, a bi-directional buffer generally designated 94 isolates the data bus 28 from the data lines of the memory integrated circuit. A tri-state buffer 74' (Part No. 74LS125) is controlled by the read-write control line R/$\overline{W}$ connected to its active-low control terminal so that incoming bytes of data on bus 28 are written to either the present scan memory 38' or the past scan memory 43' depending on the value of the past scan address bit $A_6$.

To perform a byte read operation, a second tristate buffer 96 is active whenever (i) the read/write control line R/$\overline{W}$ is high, (ii) the board select line 52 is active, and (iii) the bit read address line $A_{12}$ is low. A NAND gate 97 (Part No. 74LS10) and an inverter 98 provide the required logical function for activating the tri-state buffer 96.

A single NAND gate 99 (Part No. 74LS10) receiving the read/write control line R/$\overline{W}$, the board select line 52, and the bit read address line $A_{12}$, is used to activate the bit read output buffers 64, 67 for bit read operations. It should be noted that the bit read memory map corresponding to the address allocations of FIG. 8 is in fact the same as the read memory map of FIG. 2 so long as it is recognized that the board select number N is an odd number for the bit read operation, and is an even number (M = N − 1) for the byte read and write operations. The board select circuit 40' responds to addresses having a first hexadecimal digit of N or M due to the fact that only the three most significant address lines $A_{15}$–$A_{13}$ are fed to the comparator 51. Bit transitions must be read at byte addresses from zero to sixty-three, corresponding to the address bit $A_6$ being a logical zero. It is possible, however, to read individual bits of the past scan memory 43' merely by specifying byte addresses between 64 and 127 during a bit read operation which does not seek transition information.

The byte read operation may be used to transfer entire words from memory section 38' to the accumulator of the CPU 23 where they may be tested for "all ones" or "all zeros." This provides useful options in designing the executive numerical control program for the system. Such byte read transfer to the accumulator is also used during input scans now to be described.

The byte read operation, as well as the byte write operation, is used during input scans. To deal with one data word during an input scan, its "present value" is first read from present scan memory 38' to the CPU 23; such "present value" is next written to the corresponding address location in the past scan memory section 43'; then the corresponding data word is read from the board 35 (FIG. 1) to the CPU 23; and finally that word is written to the original location in the memory section 38'.

One suitable input scan sub-routine (which may be entered on a timed interrupt or otherwise) is shown in FIG. 10. Certain address assignments are arbitrarily assumed in FIGS. 9 and 10 to create an explanatory example. First, it is assumed that present scan memory words reside at addresses 0 to 63 (hex 00 to 3F in FIG. 9) and that past scan memory words reside at 64 to 127 (hex 40 to 7F) in the one hundred twenty-eight word memory 91. Thus, "corresponding" present and past scan words are offset by sixty-four (hex 40) address locations. Second, it is assumed that the input data words on the single bit I/O board 35 which correspond to address locations 00 to 3F in the memory section 38' are located at a block of addresses FA1 to F40 on the I/O board 35 which is enabled by higher order address signals on lines $A_{15}$–$A_{12}$ equal to one hexadecimal digit less than the board select value M for board 36'. That is, if the quasi or generalized hexidecimal high order digit M selects board 36', then it is assumed that M − 1 = L selects the I/O board 35, and the sixty-four words of single bit input data reside at addresses LFA1 through LF40. This means that if hex 5F is subtracted from the first address M000 in the memory 91, the result is LFA1, i.e., the address of the first input signal data byte on I/O board 35.

It will be seen that the first step 101 in FIG. 10 involves setting the index register X of the CPU 23 equal to a value of M000—5F, where M000 is the first address for present scan memory 38' and 5F is the downward offset required to reach the corresponding first address on the I/O board 35. Thus, the index register X points to the lowest or first byte address LFA1 for input data on the I/O board 35. In step 102, the lowest original byte is read from the first address location M000 of the present scan memory 38' by loading the accumulator A using an indexed instruction with an offset of 5F hexadecimal (X + OFFSET = LFA1 + 5F = M000). In step 103 the lowest original byte is written into the respective address location of the past scan memory 43' using an indexed store accumulator instruction with an offset of 9F hexadecimal. Now that the lowest original byte has been transferred from the present scan memory to the past scan memory, the new byte at the lowest input address of the single-bit input/output board 35 is read using an indexed load accumulator with an offset of zero. In step 105 the new input byte is stored in the respective present scan memory location 39' using an indexed store accumulator instruction with an offset of 5F hexadecimal. Then in step 106 the value of the index register X is incremented in order to point to the next input byte. In step 107 the value of the index register X is compared to a predetermined maximum value XMAX in order to determine whether all of the input bytes have been transferred. If not, execution returns to step 102 to transfer and read the next input byte. When all data words in board 35 have been so transferred to the board 36' the test at 107 is affirmative and the input scanning routine is finished.

The numerical control executive program for the CPU 23 continues with instructions controlling the operation of the machine tool 21. In order to condition or control the sequence of different executive iterations based on the values of (a) any single input bit (taken in true or complement form), or (b) the occurrence of a transition in any input bit (taken as positive or negative going) may be tested by reading the phantom memory location in the read memory map of FIG. 3, as in step 108 of FIG. 10, and a branch instruction can be executed in step 109 to branch to program locations conditioned on whether the tested bit is a logical one (set) or a logical zero (clear). Moreover, the single bits 50 read out onto the data bus line $D_0$ may be used in chains of Boolean logic operations performed in the lowest order bit location of the CPU 23.

The eight-bit single memory integrated circuit embodiment of FIGS. 8-10 has a few disadvantages in comparison with the eight-bit dual memory integrated circuit embodiment of FIGS. 3-7. These disadvantages are that the input scanning is about 50% slower, the scanned memory capacity is 50% smaller, and the memory space consumed by partial decoding and phantom addressing is 100% greater.

Figure 11:
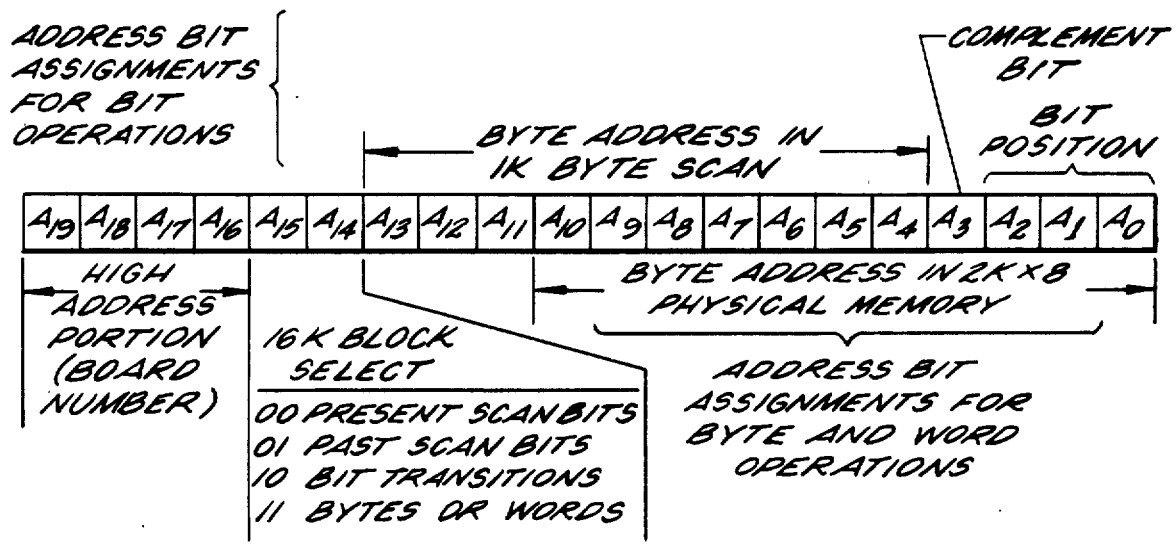
FIG. 11 is a field diagram for the address line allocation for a third embodiment of the invention with memory words, as seen by the central processor, sixteen bits wide.

Applicant has found, however, that these disadvantages are insubstantial for apparatus which employs a CPU that is sixteen bits wide (accumulator and data bus with sixteen places) and an address bus twenty bits wide—with the address assignments shown in FIG. 11. The use of a single integrated circuit memory (only eight bits wide) is in fact preferred for the embodiment which utilizes the sixteen bit microprocessor. In this embodiment, the high address portion providing the board number is four bits $A_{10}$–$A_{16}$ and the scanned memory comprises one kilobyte of memory locations. Moreover, the address assignment scheme shown in FIG. 11 provides for double-byte read and write operations.

The individual operations provided are tabulated in FIG. 12. The word operations (manipulating sixteen data bits) are distinguished from the byte operations (manipulating the higher or lower order bytes of a word) by a byte high enable control line BHEN. Moreover, a bit write operation is provided. The bit operations are distinguished from the byte and word operations by the range of permissible addresses for the bit, byte and word operations. Instead of using a single read/write control line, separate read MRDC and write MWTC control signals are provided. These control signals correspond to an IEEE 796 standard bus, making up the bus 26 (FIG. 1) which is presumed to be interfaced to an Intel 8086 16-bit microprocessor comprising the central processing unit 23.

Shown in FIG. 13 is a memory map corresponding to the address assignment scheme set out in FIG. 11. Moreover, shown in FIG. 14 is the physical memory map of the 2K × 8 physical memory providing the one kilobyte of sixteen bit data word storage in memory only eight bits wide. It should be noted that word operations correspond to the reading or writing of two bytes to the physical memory. The low order byte of the 16-bit word is stored at even byte addresses for the physical memory, for which the address bit $A_0'$ to the physical memory is logical zero. The high order half of a sixteen bit data word is stored at odd byte addresses in the physical memory for which the address bit $A_0'$ is a logical one.

Shown in FIG. 15 is a functional block diagram for the 16-bit embodiment of a memory processor 36" according to the present invention. It uses a single 2K × 8 memory integrated circuit 91' (Part No. HM6116P-3) which corresponds to the addressing shown in FIGS. 13 and 14 to perform the operations shown in FIG. 12. This memory processor 36" is interfaced to a 16-bit central processing unit 23 via a 20-bit address bus 27', a control bus 29', and a double-byte or 16-line data bus 28' consisting of a low-byte bus 118 and a high-byte bus 119. It should be noted that all signals on the buses 27', 28', 29' are active low and are buffered as soon as they enter the memory processor board 36". The address bus 27' is fed to an address buffer 121. The control bus 29' is fed to a control buffer 122. For byte transfer operations, a bi-directional high-byte buffer 123 is provided for the high-byte data bus 122, and a bi-directional low-byte buffer 124 is provided for the low-byte data bus 121. The control board 36" uses the same bit output buffers 64, 67 as were used in the eight-bit processor boards 36, 36' shown in FIGS. 5, 9, respectively, for the bit read operations. Moreover, a bit input buffer 126 receives an input bit on the data line $D_0$ as an argument for the bit write operations.

In contrast to the eight-bit processor boards 36, 36' of FIGS. 5 and 9, the expanded operation set shown in FIG. 12 requires more control signal logic so that it is preferable to use a programmable logic array (PAL) 127 (e.g., Part No. PAL10L8) to constitute what were herein previously called the board select circuit 40" and the control logic 42". The programmable logic array 127 is programmed to generate control signals according to the Boolean logic equations given in Table I appended to the specification. Moreover, a 100 nanosecond timer 69' responsive to the CCLK control signal divides the memory read or write cycle of the 16-bit microprocessor unit into five 100 nanosecond sub-periods. The control signals generated by the programmable logic array 127 depend on the particular 100 nanosecond period clocked by the timer 69'. The timer 69' is, in practice, a synchronous counter comprised of a five stage shift register (Part No. 74LS164) clocked by a 10 MHZ control clock signal CCLK, reset in the absence of a true board select signal, and shifting in a logic high signal.

It should be noted that the location of the actual byte address (or word address with the least significant address bit equal to zero, or even addresses) is positioned differently for bit operations than for word operations. This is evident from the address assignment diagram of FIG. 11. For bit operations, the byte address occupies the second, third, and fourth most significant hexadecimal digits of the address. But for word operations, the bit address occupies the third, fourth, and fifth most significant hexadecimal digits. To account for the different addressing of the memory integrated circuit 91' for bit as compared to byte or word operations, an address multiplexer 131 (Part No. 74LS157) accepts address bits $A_{10}$–$A_0$ on one set of input lines and address bits $A_{14}$–$A_4$ on the other set of input lines. The address multiplexer 131 has its select input receiving a SEL BYTE control signal which (a) is a logical zero for a bit operation wherein input address signals $A_{14}$–$A_4$ are selected for transmission to memory address lines $A'_{10}$ to $A'_0$, and (b) is a logical one for byte or word operations wherein address bits $A_{10}$–$A_0$ are selected. For bit read operations, the memory integrated circuit 91' is first read at a present scan memory location for which the address bit $A'_{10}$ is a logical zero, as shown in FIG. 14, and then the memory integrated circuit 91' is read at a corresponding past scan memory location for which the address bit $A'_{10}$ is a logical one. Thus, a logical OR gate 92' is used to toggle an address line to the memory integrated circuit 91'. Due to the fact that the address input bit $A'_{10}$ to the memory integrated circuit 91' is specified by address bit $A_{14}$ fed to the address multiplexer 131, the logical OR gate 92' is inserted in the $A_{14}$ address line feeding the address multiplexer 131. The logical OR gate 92' has its output set to one by a BR SCAN control signal which is a logical zero for reading the present scan and a logical one for reading the past scan. Similarly, for word read or word write operations, the low or even byte is stored at addresses having address bit $A_0'$ being a logical zero, and high or odd bytes are stored with the address bit $A_0'$ being a logical one.

Therefore, the address line $A_0$ to the input of the address multiplexer 131 passes through a logical OR gate 132 which sets the address bit $A'_0$ to a one for addressing the high or odd bytes stored in the memory integrated circuit 91'. The logical OR gate 132 receives a WR BYTE control signal which is a logical zero for addressing the low or even byte and is a logical one for addressing the high or odd byte stored in the memory integrated circuit 91'.

For receiving the low or even byte and the high or odd byte read from the memory integrated circuit 91', respective low and high byte latches 133, 134 are sequentially strobed at the beginnings of the 200 nanosecond and 400 nanosecond cycles of the 100 nanosecond timer 69'. The latches 133, 134 have tri-state outputs enabled by a LCH ENA signal and the outputs define an eight-bit low bus 118' and an eight-bit high bus 119', respectively. The low and high buses 118', 119' are connected to the low and high byte data buses 118, 119 through the gate-controlled low-byte buffer 123 and the high-byte buffer 124, respectively. The direction of the data transfer from the data bus 28' to the low and high buses 118', 119' is specified by a DIR signal and the buffers 123, 124 are individually enabled by control signals L BYT ENAB, H BYT ENAB, respectively.

The logic processor circuits generally designated 45 are the same circuits used in the eight-bit embodiments of FIGS. 5 and 9, including bit selectors 55, 56, polarity inverting exclusive-OR gates 58, 59, and the transition logic NAND gates 61 and 62. The complement of a single bit or the polarity of a transaction to be read is designated by the signal on address line $A_3$; the transition or single bit read-out is determined by the signal on address line $A_{15}$.

To perform a bit write operation, the addressed byte is first read from the memory 91' into the low-byte latch 133 and the bit in the byte to be changed, if necessary, is changed by a particular gate in a bank of eight exclusive-OR gates 136; the changed byte is written back into the memory 91'. A bit select demultiplexer 137 (Part No. 74LS259) sends a bit change signal, if necessary, to the bank of exclusive-OR gates 136. This bit change signal is generated by an exclusive-OR gate 138 whenever the existing bit provided by the exclusive-OR gate 58 is different from the input bit $D_0$ provided by the bit input buffer 126.

Data also flows through the exclusive-OR gate 136 during a byte write operation and the de-multiplexer 137 has a gate input G that is activated only during the bit write operation selected by the BIT WR control signal so that during a byte write operation the demultiplexer 137 presents an output of zeroes to the bank of exclusive-OR gates 136, resulting in the low byte on the low bus 118' being transferred through the exclusive-OR gates 136 to the memory 91'.

A write multiplexer 139 (Part No. 74LS257) is provided so that either (a) the output of the exclusive-OR gates 136 or (b) the high bus 119' is written into the memory 91' during a write operation. The write multiplexer 139 receives a WRITE SEL signal to select data from either the high bus 119' or the exclusive-OR gates 136 depending on whether the select input is a logical one or a logical zero, respectively.

The above-described architecture for the memory processor 36'', combined with the control signal logic summarized in Table I appended to the specification, completely defines the manner in which the operations summarized in FIG. 12 are executed. In other words, the control signals guide addresses and data through the architecture in FIG. 15 to perform different ones of several possible and differing specific execution sequences. These execution sequences are outlined in Table II, appended to the specification.

Summarizing these execution sequences briefly, for a bit read operation, the addresses are taken from the address bus 27', right shifted by one hexadecimal place by the address multiplexer 131 and placed on the address input lines $A'_{10}$ to $A'_0$ of the RAM memory 91'. At 200 nanoseconds from the time the memory processor board 33'' was first addressed thereby activating the BOARD SELECT signal to enable the 100 nanosecond timer 69' to start counting, the addressed present scan byte is read from the memory 91' and received in the low-byte latch 133. Then the most significant address bit $A_{10}'$ to the memory 91' is set to one by the OR gate 92' so that the corresponding past scan byte is addressed in the RAM and is transferred to the high-byte latch 134 at 400 nanoseconds. The outputs of the low-byte latch 133 and the high-byte latch 134 are enabled so that the present scan byte appears on the low bus 118' and the past scan byte appears on the high bus 119'. The desired bit position is selected by the multiplexers 55, 56 and complementing or transition detecting operations are selectively performed on the single-bit outputs of the multiplexers 55, 56. The single-bit result is placed on the least significant bit $D_0$ of the low-byte data bus 118 by the bit output buffers 64, 67 with logical zeros being asserted on the other low-byte data lines $D_7$–$D_1$ when the bit output buffers 64, 67 are enabled by the BIT R control signal.

For a bit write operation, the desired byte is first read from the memory 91' into the low-byte latch 133 at 200 nanoseconds, and low-byte latch is enabled to assert the desired byte on the low bus 118'. The data input bit to be written (as coming from the CPU 23) is taken from the $D_0$ line of the low-byte data bus 118 through the bit buffer 126 and compared by the exclusive-OR gate 138 to the original bit value in the desired bit position of the desired byte. The result of this comparison is placed at the desired bit position by the demultiplexer 137 and passed to the bank of exclusive-OR gates 136 to change, if necessary, the original bit in the desired bit position of the byte on the low bus 118'. The output of the exclusive-OR gates 136 is written back into the memory 91' at the original address during the period of 300–400 nanoseconds with the new data byte being placed on the data lines of the memory 91' by the write multiplexer 139 having its selector input set to zero by the WRITE SEL control signal.

For a byte read or a word read operation, the address multiplexer 131 selects the byte addressing mode and applies the desired byte address $A_{10}$–$A_0$ to the memory 91'. At 200 nanoseconds in the timing sequence, the low byte is read and latched into the low-byte latch 133. The output of the low-byte latch 133 is enabled and the low-byte passes through the low-byte buffer 123 to the low-byte data bus 118. Then the least significant address bit $A'_0$ to the memory 91' is set high by the OR gate 132 to select the high byte, and at 400 nanoseconds the high-byte latch 134 receives the desired high-byte from the memory 91'. If the word read control signal BHEN is a one, the high-byte buffer 124 is also enabled passing the high-byte from the high-byte latch 134 to the high-byte data bus 119. Since two bytes of data now appear simultaneously as a word on the sixteen bit data bus, they may be accepted as one word in the CPU.

For a byte write or a word write operation, the low byte passes through the low-byte buffer 123 to the low bus 118', through the bank of exclusive-OR gates 136 receiving zeros from the output of the demultiplexer 137, to the write multiplexer 139 and is written into the memory 91' during the time period 100 nanoseconds to 200 nanoseconds. Then the least significant address bit A₀ is set to one by the OR gate 132, and the high-byte is passed onto the high bus 119' by the high-byte buffer 124 if BHEN is a logical one for a word operation. Then the high-byte is applied to the data lines of the memory 91' by the write multiplexer 139 and written into the memory during the 300 to 400 nanoseconds interval if, again, the word control signal BHEN is a logical one to call for a word operation.

It should be noted that there is no automatic means in FIG. 15 for transferring bytes from the present scan memory locations to the past scan memory locations. From the architecture of FIG. 15, however, it is evident that control signals may be provided to read an original addressed byte from present scan memory, for example into the low-byte latch 133, and then to write the original byte back into the memory 91' at a past scan memory location. However, such an instruction is thought unnecessary since a 16-bit microprocessor can transfer data from the past scan memory to the present scan memory at approximately the same rate by using a word read operation to read two original bytes from the present scan memory during one instruction cycle of the microprocessor, and by using a word write operation to write the two original bytes into the past scan memory during a second microprocessor instruction cycle.

By using a 16-bit microprocessor for the central processing unit 23 in FIG. 1, and using the memory processor board 36" for the memory processor 36 in FIG. 1, all of the machine sensor bits can be scanned en masse every 20 milliseconds and transferred to the present scan memory of the memory processor board 36" using word read and word write operations in the same manner as the byte read and byte write operations described above with reference to FIG. 10. In between the scans of the input logic signals from the machine sensors, the central processing unit 23 may examine words or bits and perform the part program Boolean operations to change or leave unchanged the stored contents at certain locations in the memory 91' of the memory processor board 36". Then, at periodic intervals for output scanning, single-bit output signals taken as words or bytes are read from the present scan memory of the memory processor board 36" and written to the single bit input/output board 35, thereby to appropriately control the single-bit actuators (such as solenoid valves, lights or alarms) at the machine tool 21.

In one sense, the memory processor board 36" forms an input image table for single-bit sensor signals from the machine tool 21 and it also forms an output image table for logically determined output bits to be applied to actuators on the machine tool, those determined output bits resulting from Boolean logic operations performed by, and according to the executive program of, the central processor 23. The advantage of using the memory processor board 36", however, resides in the fact that the image table may be accessed by the central processor 23 with a number of different address combinations which represent desired logical functions, and the single-bit information which is read out comes back with some manipulation, i.e., as true or complement or as an indication of whether a transition has occurred from a logical zero to one or a logical one to zero.

From the broad viewpoint, therefore, the system of FIG. 1 as a whole uses the central processor 23 as an arithmetic unit to perform the mathematical calculations associated with interpolation and closing the servo loops for the multiaxis contouring of the machine tool 21 in a fashion broadly known in the art. The same central processor 23 also functions, in effect, as a "programmable controller" to carry out the necessary Boolean logic operations on single bits of machine information. The memory processor board 36" provides input and output image tables assisting the programmable controller and makes it possible to deal with single-bit input data and single-bit output data in 16-bit groups (words) or 8-bit groups (bytes) but with accessing of single bits for the necessary Boolean logic sequences. The memory processor board 36" relieves the central processor 23 of some work because it performs certain logic operations when a selected bit is read, the particular logic operation being determined by address line signals over and beyond the number of address lines necessary to simply read back a word from the physical memory 91' on the memory processor board 36". In summary, the available single-bit logic operations performed in the memory processor board 36" as a consequence of selective addressing are: the reading of a selected bit of a selected word either in its true or complement form, and a reading of a selected bit of a selected word with the response indicating whether or not that selected bit has experienced a zero-to-one or a one-to-zero transition since the "previous scan" was executed.

TABLE I

Control Signal Logic

TRUE BOARD SELECT = [N0000–NCFFF]
  —addresses which activate the memory processor board (36")—

SEL BYTE = [N0000–NBFFF]
  —bit operation addresses are N0000–NBFFF Hex.—
  —byte operation addresses are NC000–NCFFF Hex.—

R/W̄ = M̄W̄T̄C̄ + [NC000–NFFFF] (100 to 200 ns) +

([N10000–N7FFF] + [NC000–NFFFF] * BHEN * (300 to 400 ns)
  —Never write to the RAM (91') for memory read operation;
    byte and word write writes to RAM 100 to 200 ns; bit
    write and word write writes to RAM 300 to 400 ns—
WRITE SEL = WR BYTE = BR SCAN =

(MWTC * [N0000–N7FFF]) * (200 ns to 400 ns)
  —Except for a bit write operation, select the high bus
    (119'), and address the second byte for byte operation
    or last scan for bit operation, for times between 200
    ns to 400 ns—
BITWR = MWTC * [N0000–N7FFF]
  —bit write operation—
LCH ENA = MRDC * [N0000–NFFFF] +
MWTC * [N0000–N7FFF]
  —enable the outputs of the latches (133, 134) during
    any read or bit write operation—
DIR = MRDC —HIGH OUT TO BUS—
  —data directed to the data bus (28') only if there is
    a memory read—
HBYT ENA = BHEN * (MWTC + MRDC * (>300 ns)) *
[NC000–NFFFF]
  —high-byte buffer (124) enabled if a word write operation
    or a word read operation after 300 ns—
L BYT ENA = (MWTC + MRDC * (>300 ns)) * [NC000–NFFFF]
  —low-byte buffer (123) enabled if byte or word write
    operation, or a byte or word read operation after
    300 ns—
BIT R = MRDC * [N0000–NBFFF] * (>300 ns)
  —bit output buffer (64, 67) enabled if bit read after

TABLE I-continued
Control Signal Logic 300 ns—

TABLE II
EXECUTION SEQUENCES

1. BIT READ
   MWTC = 0, MRDC = 1, [N0000-NBFFF]
   (a) SEL BYTE = O, R/$\overline{W}$ = 1, BR SCAN = O
       LCH ENA = 1, DIR = 1
   (b) Bit addressing mode is applied to the RAM (91').
   (c) At 200 ns the addressed scan byte from the RAM is
       latched into the low-byte latch (133) and applied
       to the low bus (118').
   (d) At 200 ns, BR SCAN is set to a logical 1. The past
       scan address is sent to the RAM.
   (e) At 400 ns, last scan data is latched into the
       high-byte latch (134) and is applied to the high
       bus (119'), the bit multiplexer (55, 56) selects
       the desired logical operation, and BIT R is set
       high putting the single-bit result on the low-byte
       data bus (118).

2. BIT WRITE
   MWTC = 1, MRDC = O, [N0000-N7FFF]
   (a) SEL BYTE = O, R/$\overline{W}$ = 1, BR SCAN = O
       BIT WR = 1, LCH ENA = 1
   (b) Bit addressing mode is applied to the RAM (91').
   (c) At 200 ns the addressed scan byte from the RAM is
       latched into the low-byte latch (133). BR SCAN
       stays zero, so that the write multiplexer (139)
       selects the changed data word processed by the
       exclusive-OR gates (136) changing the desired bit
       if necessary as selected by the bit select de-
       multiplexer (137). At 300 ns to 400 ns the R/$\overline{W}$
       line goes low, writing the word with the changed
       bit back into the RAM.

3. BYTE READ/WORD READ
   MWTC = O, MRDC = 1, [NC000-NCFFF]
   (a) SEL BYTE = 1, R/$\overline{W}$ = 1, DIR = 1, WR BYTE = O
   (b) Byte addressing applied to the RAM (91').
   (c) At 200 ns the addressed scan byte from the RAM is
       latched into the low-byte latch (133) and applied
       to the low bus (118').
   (d) At 200 ns, WR BYTE is set to 1 and high byte address-
       ing is applied to the RAM.
   (e) At 300 ns, the low-byte data output buffer (123)
       enabled; the high-byte data output buffer (124)
       is enabled if BHEN = 1 (i.e., word read operation).
   (f) At 400 ns, the high byte read from the RAM is latched
       into the high-byte latch (134) and applied to the
       high bus (119'). The high byte is put on the high-
       byte data bus (119) if BHEN = 1 (i.e., word read
       operation).

4. BYTE WRITE/WORD WRITE
   MWTC = 1, MRDC = O, [NC000-NCFFF]
   (a) SEL BYTE = 1, R/$\overline{W}$ = 1, DIR = O,
       WR BYTE = O,
       WRITE SEL = O, H BYT ENAB = 1,
       L BYT ENAB = 1
       LCH ENA = O, BIT WR = O. The high bus (119')
       contains the high byte from the high data bus
       (119) if BHEN = 1 (i.e., word write) and the
       low bus (118') contains the low byte from the
       low-byte data bus (118) which passes through
       the exclusive-OR gates (136) without change
       and is asserted on the O input of the write
       multiplexer (139) and is transferred to the RAM.
   (b) At 100 ns the R/$\overline{W}$ input to the RAM goes low,
       writing the low byte (i.e., first byte) into
       the RAM.
   (c) At 200 ns the R/$\overline{W}$ input to the RAM goes high,
       completing the writing of the first byte.
       Then WR BYTE and WRITE SEL go high, thus put-
       ting the second high byte address on the RAM
       address inputs and the high byte data on the
       RAM data lines.
   (d) IF BHEN is high (i.e., word write), then at
       300 ns R/$\overline{W}$ goes low, and at 400 ns R/$\overline{W}$ goes
       back high, thus writing the second (high)

TABLE II-continued
EXECUTION SEQUENCES byte into the RAM.

What is claimed is:

1. In a digital computer system having a central processor and memory for storing multiple bit words of changeable data as a result of memory write operations executed by said central processor, the memory being interfaced to the central processor via a computer bus which includes an address bus and a data bus, a memory processor connected to the computer bus and comprising, in combination, (a) means responsive to a certain type of said memory write operations executed by the central processor for receiving and storing in second and first storage locations respective past and present multiple bit values of a data word, said second and first locations being addressed by corresponding addresses asserted on said address bus by said central processor, with the past value of the data word initially being transferred from said first to said second storage location and said present value of the data word being transmitted by said central processor over said data bus to said first location, (b) means for performing one of a plurality of logic operations including detecting transitions in corresponding bits on past and present values held at a pair of storage locations identified by a given single address asserted on said address bus by said central processor during each one of certain memory read cycles executed by said central processor, and (c) means for transmitting over said data bus to said central processor during such read cycle either (i) a selected bit from the first storage location of the identified pair, (ii) the complement of a selected bit from the first storage location of the identified pair, or (iii) an indication of a transition in a selected bit of the identified pair of storage locations, said means (b) and (c) including means responsive to signals asserted on said address bus during such read cycle for uniquely selecting one of said actions (i)–(iii) depending on whether the address signals are respectively within a first, second, or third predetermined range of addresses.

2. The memory processor as claimed in claim 1 wherein said means (a) includes means (d) responsive to a single write cycle which constitutes a memory write operation of said certain type for (1) reading a present value from an addressed first storage location, and thereafter (2) writing the value so read into a correspondingly addressed second location as a past value, and (3) storing the word of said changeable data transmitted by said central processor over said data bus in the addressed first storage location as a present value, wherein said reading (1), said writing (2) and said storing (3) are performed and completed within the duration of said single write cycle.

3. The memory processor as claimed in claim 1, wherein said means (c) includes means for transmitting over said data bus an indication of whether said transition in said selected bit is a zero-to-one transition or a one-to-zero transition, the selection being made in response to signals asserted on the address bus.

4. A memory shift register operable in response to write commands signaled on data and address buses from a central processor and comprising, in combination,
- a first addressable memory having a plurality of address inputs, a plurality of data terminals, and a read/write control terminal,
- a second addressabe memory having a plurality of address inputs connected to corresponding address inputs of the first memory, a plurality of data terminals, and a read/write control terminal connected to the read/write terminal of the first memory, and
- a latch having a clock input and data inputs connected to the data terminals of the first memory and having data outputs connected to the data terminals of the second memory, and
- clocking means responsive to a write command signaled on said buses for generating a cyclic read/write signal to the read/write terminals of the memories and generating a clock signal to the latch so that during a single cycle of said read/write signal data are successively (a) read from an addressed location of the first memory, (2) clocked into the latch, and then (3) written from the latch into the second memory at a corresponding memory location.

5. The memory shift register as claimed in claim 4, wherein the data terminals of the first memory are bidirectional, and further comprising means for applying data signals from said data bus to the data terminals of the first memory during the time that data is being written from the latch, so that new input data is written into the first memory when the original data stored in the latch is written into the second memory.

6. In a digital computer system having a central processor and several boards connected to a computer bus having an address bus and a data bus, the boards including at least one memory board and a single-bit signal input board,
 a memory processor board comprising, in combination
 (a) present scan memory means for receiving multiple bit words of data during a memory write operation by the central processor, said present scan memory means having address inputs receiving address signals from said address bus and data terminals for receiving data from said data bus for storage and for later asserting the stored data when the stored data are addressed,
 (b) past scan memory means for receiving at corresponding addresses words of original data transferred from the present scan memory before the present scan memory receives corresponding new words of data from the central processor unit, said past scan memory means having address inputs receiving address signals from said address bus and data terminals for receiving said data for storage and for later asserting the stored data when the stored data are addressed,
 (c) logic processor means interconnecting said present and past memories and said data bus for
 (i) receiving from said data terminals of the present scan memory means and the past scan memory means said data addressed during a single read cycle executed by the central processor, the two memories asserting on their said data terminals stored values read from respective corresponding memory locations addressed in part by the central processor,
 (ii) performing one of a plurality of logical operations including detecting transitions in corresponding bits by combining the values asserted on the data terminals of the present scan memory with the values asserted on the data terminals of the past scan memory, and
 (iii) placing on said data bus for return to said central processor unit during such read cycle either (1) a selected bit of the value asserted on the data terminals of said present scan memory means, (2) the complement of said last-mentioned selected bit, or (3) an indication of a transition in corresponding selected bit places of the values asserted on the data terminals of said present scan and past scan memories,
 said means (c) including means responsive to signals asserted on said address bus during said read cycle for selecting one of said actions (1) to (3) depending on whether the address bus signals are within a first, second, or third predetermined range of addresses, respectively.

7. The memory processor defined by claim 6 further including means responsive to a single write cycle executed by said central processor for (1) reading data from an addressed location in said present scan memory means, (2) writing the data so read to a corresponding addressed location in said past scan memory means, and (3) storing a word of data then being transmitted by said central processor over said data bus in the addressed location of said present scan memory means, such operations being performed within the duration of said single write cycle.

8. The memory processor board as claimed in claim 7 wherein the signal on one address line of said address bus controls the selection of whether a present scan bit or a transition is returned, and the signal on another address line controls the polarity of the present scan bit or transition returned.

9. The memory processor board as claimed in claim 6 further comprising means coupled to said computer bus for writing only a single bit to any addressed bit position of any addressed word in the present scan memory means in response to certain types of addresses asserted on said address bus during a write operation.

10. The memory processor as set forth in claim 6 wherein said means (c) includes (c1) means for transmitting over said data bus when action (3) is performed either (3a) an indication of a zero-to-one transition or (3b) an indication of a one-to-zero transition, the selection being made in response to signals asserted on the address bus during the read cycle.

* * * * *